(12) United States Patent
Kitamura et al.

(10) Patent No.: US 7,772,717 B2
(45) Date of Patent: Aug. 10, 2010

(54) DUAL WIRING SYSTEM

(75) Inventors: Tsunehiro Kitamura, Katano (JP); Yoshihiro Tanikawa, Kyoto (JP); Hiroaki Takeyama, Kobe (JP); Masahiro Yamamoto, Kobe (JP); Takeshi Ueno, Kobe (JP); Kazufumi Oogi, Ibaraki (JP); Kenichi Yoneyama, Portland, OR (US); Hideshi Hamaguchi, Beaverton, OR (US)

(73) Assignee: Panasonic Electric Works Co., Ltd., Kadoma-shi, Osaka (JP)

( * ) Notice: Subject to any disclaimer, the term of this patent is extended or adjusted under 35 U.S.C. 154(b) by 106 days.

(21) Appl. No.: 11/988,275

(22) PCT Filed: Dec. 27, 2005

(86) PCT No.: PCT/JP2005/023873

§ 371 (c)(1),
(2), (4) Date: Apr. 8, 2008

(87) PCT Pub. No.: WO2007/007427

PCT Pub. Date: Jan. 18, 2007

(65) Prior Publication Data

US 2009/0134716 A1    May 28, 2009

(30) Foreign Application Priority Data

| Jul. 8, 2005 | (JP) | ............................. 2005-200990 |
| Jul. 8, 2005 | (JP) | ............................. 2005-200991 |
| Jul. 8, 2005 | (JP) | ............................. 2005-200992 |
| Jul. 8, 2005 | (JP) | ............................. 2005-200993 |
| Jul. 8, 2005 | (JP) | ............................. 2005-200994 |

(51) Int. Cl.
*H02J 3/14*    (2006.01)

(52) U.S. Cl. ............................. 307/38; 307/31; 700/19; 439/638

(58) Field of Classification Search ...................... 700/9, 700/19, 22, 286, 295, 297; 370/31, 39, 149, 370/38; 340/5.1, 10.1, 310.11; 439/638
See application file for complete search history.

(56) References Cited

U.S. PATENT DOCUMENTS 4,665,544 A    5/1987    Honda et al.

(Continued)

FOREIGN PATENT DOCUMENTS

DE    29504491    6/1995

(Continued)

OTHER PUBLICATIONS

Japanese Office Action mailed May 26, 2009, issued in Japanese Application No. 2006-515421 and the English translation thereof.

(Continued)

*Primary Examiner*—Charles P Kasenge
(74) *Attorney, Agent, or Firm*—Edwards Angell Palmer & Dodge LLP

(57) ABSTRACT

A dual wiring system which has improved easy exchangeability and function expandability of function unit, and is capable of constructing a higher-order system by controlling plural function units in a coordinated fashion. A plurality of base units are mounted in wall surfaces of a building structure, and connected to both of an electric power line and an information line installed in the building structure. A function unit is detachably connected to each of the base units, and provides at least one of functions for supplying electric power from the electric power line, outputting information from the information line, and inputting information into the information line. A control unit is detachably connected to the function unit or the base unit, and controls at least two of the function units connected to the electric power line and the information line through the base unit(s) in a coordinated fashion.

14 Claims, 13 Drawing Sheets

U.S. PATENT DOCUMENTS

| | | | |
|---|---|---|---|
| 5,359,143 | A | 10/1994 | Simon et al. |
| 6,036,516 | A | 3/2000 | Byrne |
| 6,369,707 | B1 * | 4/2002 | Neer ..................... 340/539.1 |
| 6,420,964 | B1 * | 7/2002 | Nishikawa et al. ......... 340/10.1 |
| 6,624,532 | B1 * | 9/2003 | Davidow et al. ............... 307/39 |
| 6,778,308 | B2 * | 8/2004 | Otsuka et al. ................ 359/254 |
| 6,993,417 | B2 * | 1/2006 | Osann, Jr. ................... 700/291 |
| 7,034,225 | B2 * | 4/2006 | Thompson et al. ............ 174/66 |
| 2003/0050737 | A1 * | 3/2003 | Osann, Jr. ................... 700/276 |
| 2005/0076148 | A1 * | 4/2005 | Chan et al. .................. 709/246 |

FOREIGN PATENT DOCUMENTS

| | | |
|---|---|---|
| WO | WO-2005/078871 A1 | 8/2005 |
| DE | 29924724 | 3/2005 |
| EP | 0776108 | 5/1997 |
| JP | 58-060331 | 4/1983 |
| JP | 61-065555 | 4/1986 |
| JP | 64-002459 | 1/1989 |
| JP | 03-071581 A | 3/1991 |
| JP | 04-090293 | 3/1992 |
| JP | 06-078365 | 3/1994 |
| JP | 06-165338 A | 6/1994 |
| JP | 08-298690 | 11/1996 |
| JP | 10-012337 | 1/1998 |
| JP | 10-136104 | 5/1998 |
| JP | 10-208804 A | 8/1998 |
| JP | 10-304467 A | 11/1998 |
| JP | 11-187154 | 7/1999 |
| JP | 11-290402 | 10/1999 |
| JP | 2000-306643 A | 11/2000 |
| JP | 2000-348825 A | 12/2000 |
| JP | 2003-134681 | 5/2003 |
| JP | 2004-191883 | 7/2004 |
| JP | 2004-304617 | 10/2004 |
| KR | 1998-061153 | 11/1998 |

OTHER PUBLICATIONS

Japanese Office Action mailed Jan. 27, 2009, issued in Japenese Application No. 2006-515411 and the English translation thereof.

Korean Office Action mailed Jul. 17, 2009, issued in Korean Application No. 10-2008-7002541 and the English translation thereof.

Written Opinion of the International Searching Authority for PCT/JP2005/024200.

International Search Report for PCT Application No. PCT/JP2005/023873 mailed Jan. 31, 2006.

International Search Report for PCT Application No. PCT/JP2005/024199 mailed Apr. 28, 2006.

Written Opinion of the International Searching Authority for PCT/JP2005/024199.

International Search Report for PCT Application No. PCT/JP2005/024200 mailed May 10, 2006.

International Search Report for PCT Application No. PCT/JP2005/024198 mailed Apr. 27, 2006.

Ris H R: "EIB-Bus-Europäischer Installationsbus Teil 2," Elektrotechnik, Vogel Verlag K.G. Wurzburg, DE, No. 7/8. Jan. 1993, pp. 61-67, XP000567405 ISSN: 1431-9578.

International Search Report for PCT Application No. PCT/JP2005/024194 mailed May 9, 2006.

Written Opinion of the International Searching Authority for PCT/JP2005/024194.

Written Opinion of the International Searching Authority for PCT/JP2005/024198.

* cited by examiner

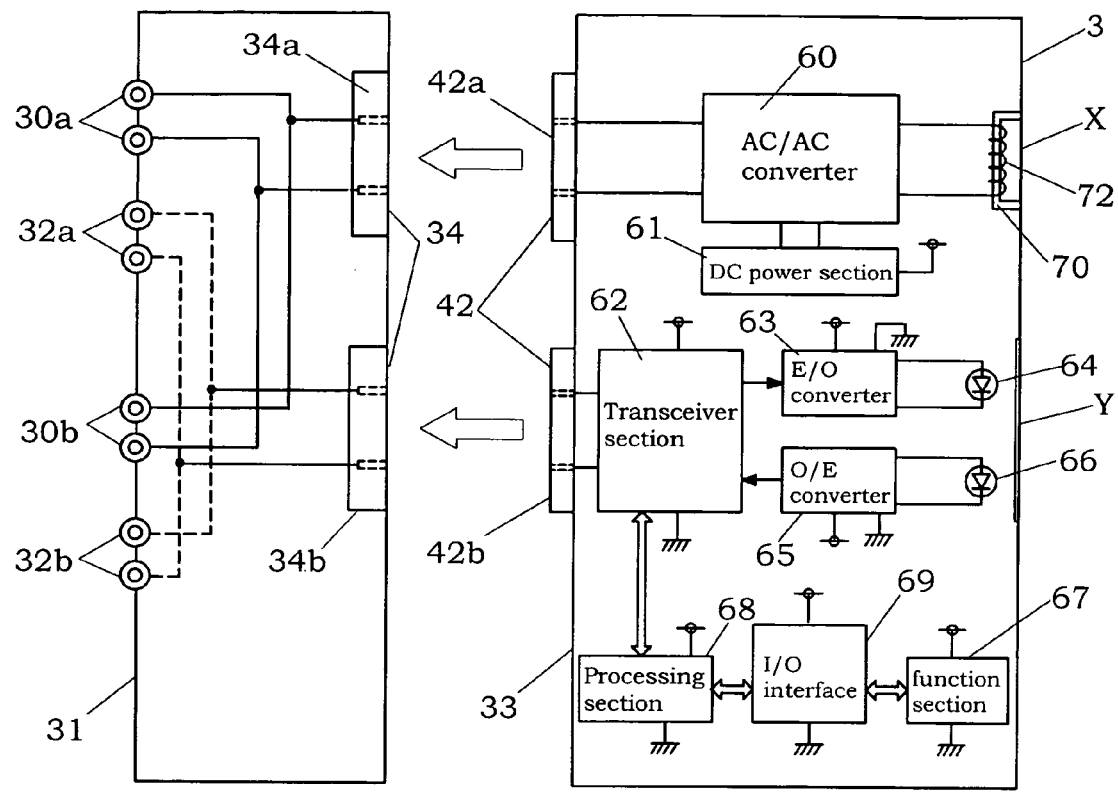
FIG. 4
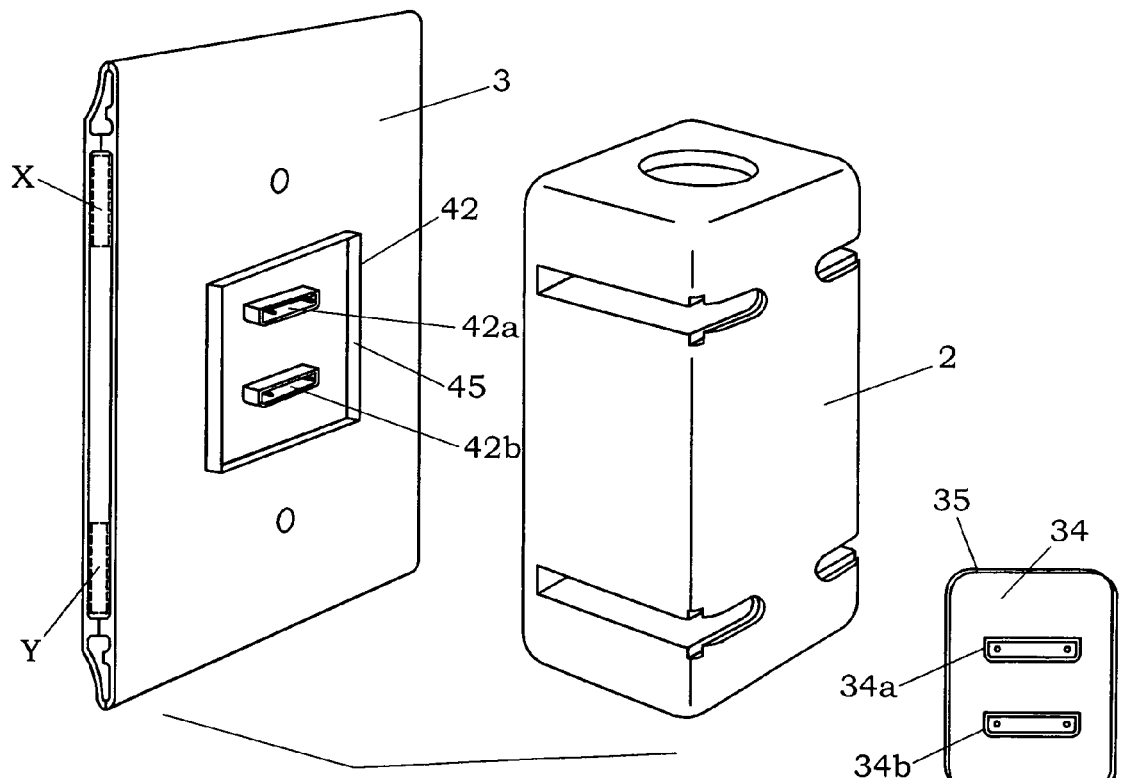
FIG. 5A
FIG. 5B

FIG. 6
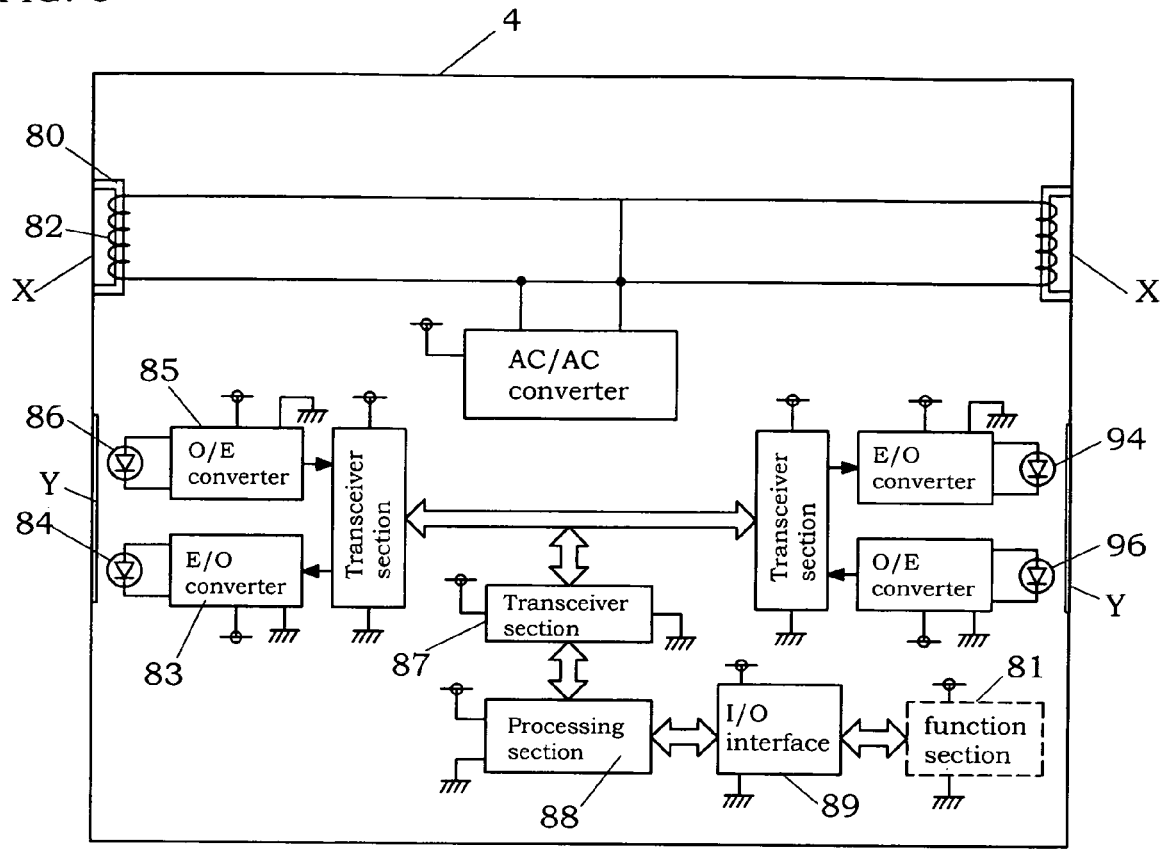
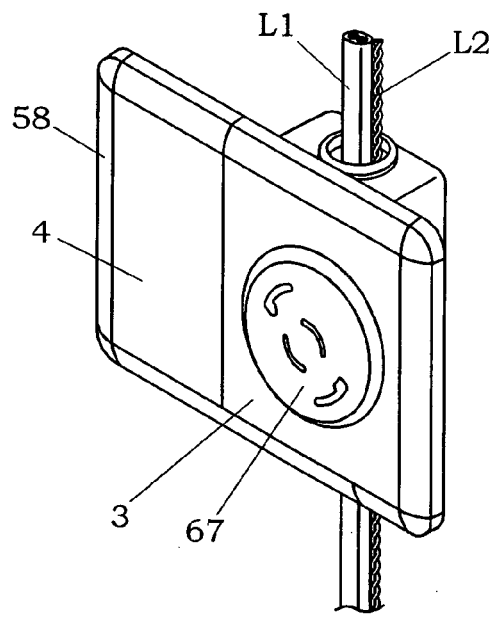
FIG. 7A
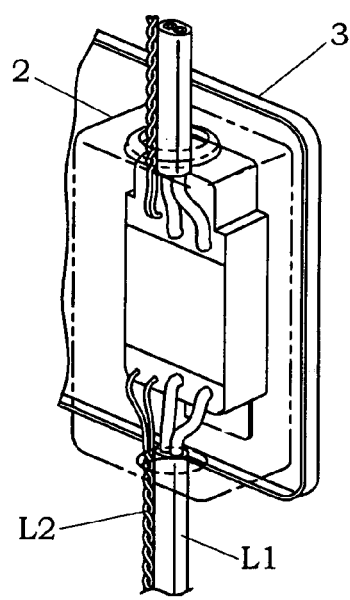
FIG. 7B

FIG. 16
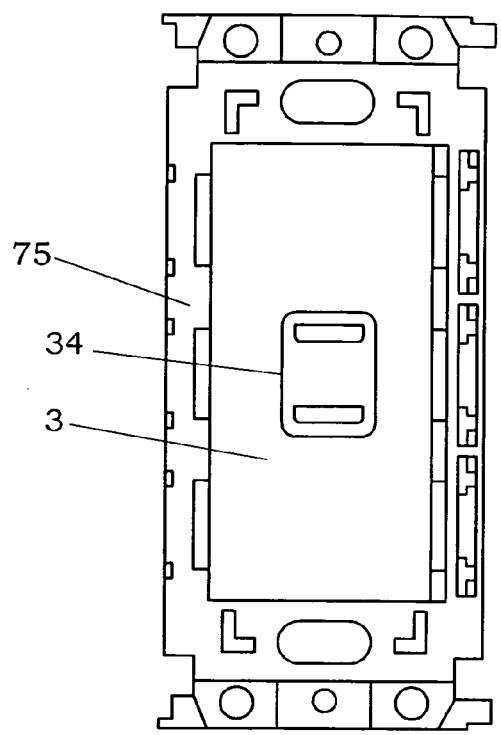
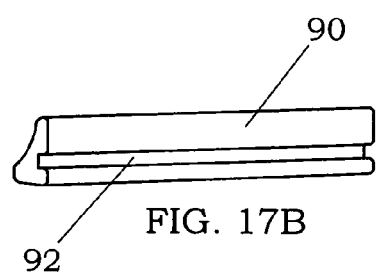
FIG. 17B
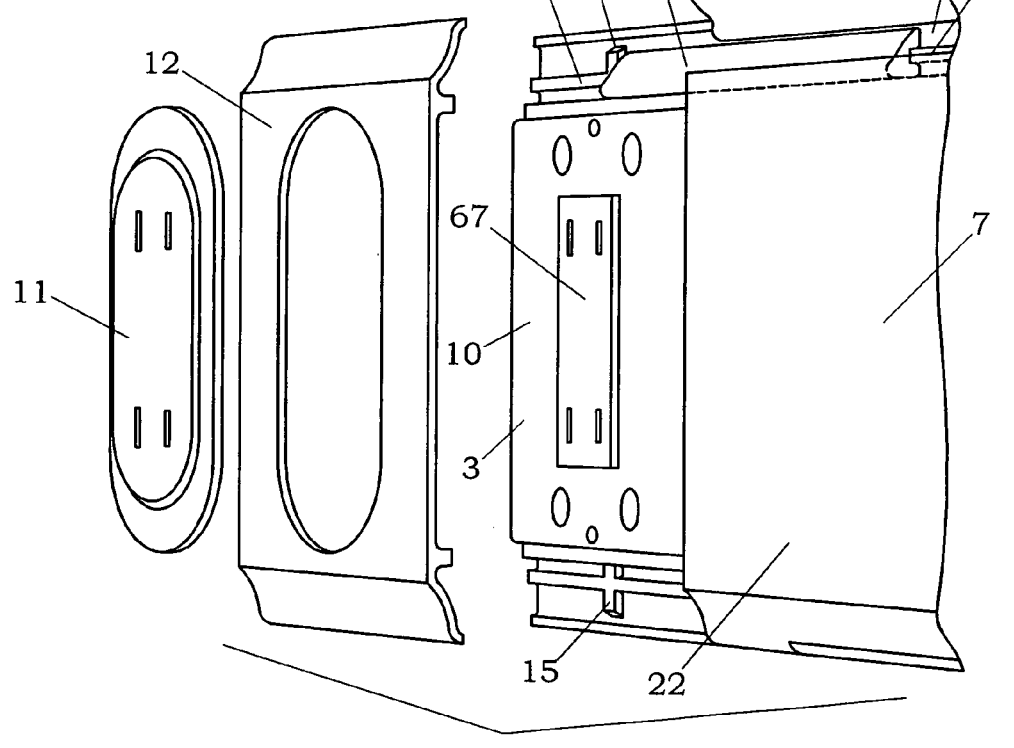
FIG. 17A

DUAL WIRING SYSTEM

CROSS REFERENCE TO RELATED APPLICATIONS

This application is related to four applications: "BASE UNIT FOR DUAL WIRING SYSTEM" filed even date herewith in the names of Masahiro YAMAMOTO et al. as a national phase entry of PCT/JP2005/024200 filed Dec. 22, 2005; "DUAL WIRING SYSTEM" filed even date herewith in the name of Masahiro YAMAMOTO et al. as a national phase entry of PCT/JP2005/024194 filed Dec. 22, 2005; "DUAL WIRING SYSTEM" filed even date herewith in the name of Tsunehiro KITAMURA et al. as a national phase entry of PCT/JP2005/023873 filed Dec. 27, 2005; and "FUNCTION UNIT FOR DUAL WIRING SYSTEM" filed even date herewith in the name of Masahiro YAMAMOTO et al. as a national phase entry of PCT/JP2005/024199 filed Dec. 22, 2005; all of which claim Japan application Nos. 2005-200990, 2005-200991, 2005-200992, 2005-200993, and 2005-200994 all filed Jul. 8, 2005, which applications are assigned to the assignee of the present application and all four incorporated by reference herein.

BACKGROUND OR THE INVENTION

1. Field of the Invention

The present invention-relates to a dual wiring system, which is used for the input/output of information signal and the supply of electric power through an information line and an electric power line installed in a building structure.

2. Description of the Related Art

Along with the popularization of the Internet, it is needed to ensure accessibility to information network at various sites in building structures such as houses and office buildings. For example, Japanese Patent Early Publication No. 11-187154 discloses a multimedia wiring system, which is provided with a distributing board for controlling a power supply line and various information lines installed in a building structure in a central control manner, and a multimedia socket panel mounted in an indoor wall surface, and connected to the distributing board through the power supply line and the information lines. For example, the multimedia socket panel has power receptacles for supplying commercial power to electric appliances, sockets used to receive broadcast programs provided by, e.g., ground-based broadcasting, satellite broadcasting and cable broadcasting, and modular jacks for analog or digital line used for, telephone system and the internet. According to this multimedia wiring system, an improvement in convenience of multimedia products is achieved, and comfortable living and working environments in the information society can be obtained.

By the way, the above-mentioned multimedia socket panel is usually mounted in the wall surface during construction of the building structure, and connected to the power supply line and the information lines. This means that functions of the multimedia socket panel are substantially determined during the construction work. Therefore, after the construction work is finished, it is generally difficult to add a new function to the multimedia socket panel or exchange a part of the existing functions of the multimedia socket panel for another function. In addition, when the existing multimedia socket panel is replaced with another multimedia socket panel, a repair work is needed. However it is not easy for the general user to perform the repair work, and the cost of the repair work is a burden to the user.

In addition, in recent years, electric appliances having various functions such as an interphone device, crime-prevention device and a disaster detection device have been mounted on the wall surfaces of the building structure. With respect to the electric appliances operated according to previously installed programs, program updates are not considered in most cases. Therefore, if necessary, the user needs to replace the existing device with a new model device or another type device. On the other hand, when a program update function is built in each of the electric appliances, it will lead to a cost increase. In addition, these electric appliances often have overlapping functions. For example, each of the crime-prevention device and the disaster-detecting device has a speaker unit such that it can function by itself. However, when both of the crime-prevention device and the disaster-detecting device are installed, it is not needed that the speaker unit is built in each of those devices. Therefore, the overlapping functions are one of important problems to be solved from the viewpoint of improvement in system efficiency and cost performance.

Thus, the conventional multimedia socket panel and the electric appliances adapted in use to be mounted in the wall surfaces still have plenty of room to improve the usage efficiency of devices in a system and the cost performance of the entire system as well as function expandability and easy exchangeability.

SUMMARY OF THE INVENTION

Therefore, to solve the above problems, a primary concern of the present invention is to provide a dual wiring system for the next generation, which is capable of easily and efficiently realizing living and working environments suitable for the individual users by use of a network for information transmission and electric power supply constructed in a building structure.

That is, the dual wiring system of the present invention comprises: a plurality of base units adapted in use to be mounted in plural positions of at least one wall surface of a building structure, and connected to both of an electric power line and an information line installed in the building structure; a plurality of function units each configured to provide at least one of functions of supplying electric power from the electric power line, outputting information from the information line, and inputting information into the information line when connected to the electric power line and the information line through one of the base units; and a control unit detachably connected to one of the function units or one of the base units, and configured to control at least two of the function units connected to the electric power line and the information line through the base unit(s).

According to the present invention, because two or more of the function units are controlled in cooperation with each other by the control unit, it is possible to achieve a higher-order system function. For example, when controlling three function units having an information display function, audio output function and an operation function of an electric appliance in a coordinated fashion, it is possible to construct an interphone system, a crime-prevention system, a disaster-prevention system, and so on. In addition, because the control unit is detachably connected to the function unit or the base unit, a mounting position of the control unit can be determined according to the user's preference. As described later, when the function units are detachably connected to each other, and the function unit is detachably connected to the base unit, system design can be performed with an increased degree of freedom. Furthermore, when one of the function units is shared by plural control units having different control programs, it is possible to achieve an improvement in usage efficiency of the function unit in the system and a reduction in cost of the entire system.

In the dual wiring system described above, it is preferred that the control unit has a drive device, in which a storage medium having control information for the function units is detachably inserted. Alternatively, it is preferred that the control unit has a storage portion configured to rewritably store the control information for the function units, and a transmission portion configured to transmit the control information provided from the storage portion to the function units.

In the dual wiring system of the present invention, it is preferred that the control unit and one of the base units or one of the function units have a pair of a module port and a module connector, which are detachably connected to each other to simultaneously establish both of an electric power transmission therebetween and a signal transmission therebetween. Similarly, it is preferred that each of the base units has one of a module port and a module connector, which is detachably connected to the other one of the module port and the module connector formed in one of the function units to simultaneously establish both of the electric power transmission between the base unit and the function unit, and the signal transmission between the base unit and the function unit. In addition, it is preferred that at least one of the function units has an electric power connector, which is detachably connected to an electric power port formed in another one of the function units to provide an electric power transmission therebetween, and a signal connector, which is detachably connected to a signal port formed in the another one of the function units to provide a signal transmission therebetween. According to the above configurations, it is possible remarkably improve easy exchangeability between the control unit and the base unit or the function unit, between the function unit and the base unit, and between the function units. Therefore, the general user can easily replace or exchange the control unit or the function unit already connected to the base unit with another control unit or another function unit without complicated repair work. Moreover, since the operationality of the function unit and the degree of freedom of layout of the function unit are improved, comfortable and convenient living and working environments can be easily achieved to meet the user's needs in the information society.

In addition, it is preferred that the dual wiring system has power supply means configured to supply electric power from one of the base units or one of the function units to the control unit by means of electromagnetic coupling, and/or signal transmission means configured to make a signal transmission between the control unit and one of the base units or one of the function units by means of optical coupling. In particular, it is preferred that the above-described module connector and module port have a pair of an electric power connector and an electric power port, which are detachably connected to each other to make the electric power transmission, and a pair of a signal connector and a signal port, which are detachably connected to each other to make the signal transmission. In this case, the electric power connector preferably makes the electric power transmission by means of electromagnetic coupling when connected with the electric power port, and the signal connector preferably makes the signal transmission by means of optical coupling when connected with the signal port. In this case, since the power transmission and the signal transmission are provided in the non-contact manner by means of the electromagnetic coupling and the optical coupling, the function unit can be operated reliably with reduced transmission loss of electric power and signals.

In addition, it is preferred that one of the above-described module connector and module port is formed at a side of the control unit such that the control unit is detachably connected to one of the base units or one of the function units in a direction along the wall surface. In this case, it is possible to improve function expandability in the dual wiring system without spoiling the beauty of indoor space.

It is also preferred that the dual wiring system of the present invention has engaging means configured to provide a mechanical support between the module connector and the module port when the electric power connector and the signal connector are respectively connected to the electric power port and the signal port. In this case, it is possible to improve the connection reliability between the module connector and the module port.

In addition, it is preferred that the dual wiring system of the present invention has joining means configured to mechanically connect the control unit to one of the base units or one of the function units. For example, the joining means comprises a first engaging portion formed on one of the base units or one of the function units, a second engaging portion formed on the control unit, and a joining member configured to make the mechanical connection between the control unit and one of the base units or one of the function units when a part of the joining member is engaged to the first engaging portion, and the remaining portion of the joining member is engaged to the second engaging portion. In this case, it is possible to improve the operation reliability of the system, and prevent the control unit from falling from the function unit or the base unit.

Further characteristics of the present invention and advantages brought thereby will be more clearly understood from the best mode for carrying out the invention described below.

BRIEF EXPLANATION OF THE DRAWINGS

FIG. 4 is a schematic circuit diagram of another base unit comprised of a gate housing and a main housing;

FIG. 5A is a perspective view of a switch box and the main housing of FIG. 4, and FIG. 5B is a plan view of a module port of the gate housing of FIG. 4;

FIG. 6 is a schematic circuit diagram of a function unit of the dual wiring system;

FIGS. 7A and 7B are front and rear perspective views of the function unit connected to the base unit;

FIG. 16 is a plan view of an attachment plate used to mount the base unit to the switch box;

FIG. 17A is an exploded perspective view showing a method of joining the control unit to the base unit, and FIG. 17B is a perspective view of a joining member;

DETAILED DESCRIPTION OF EXEMPLARY EMBODIMENTS

A dual wiring system of the present invention is explained below in detail according to preferred exemplary embodiments.

Figure 1:
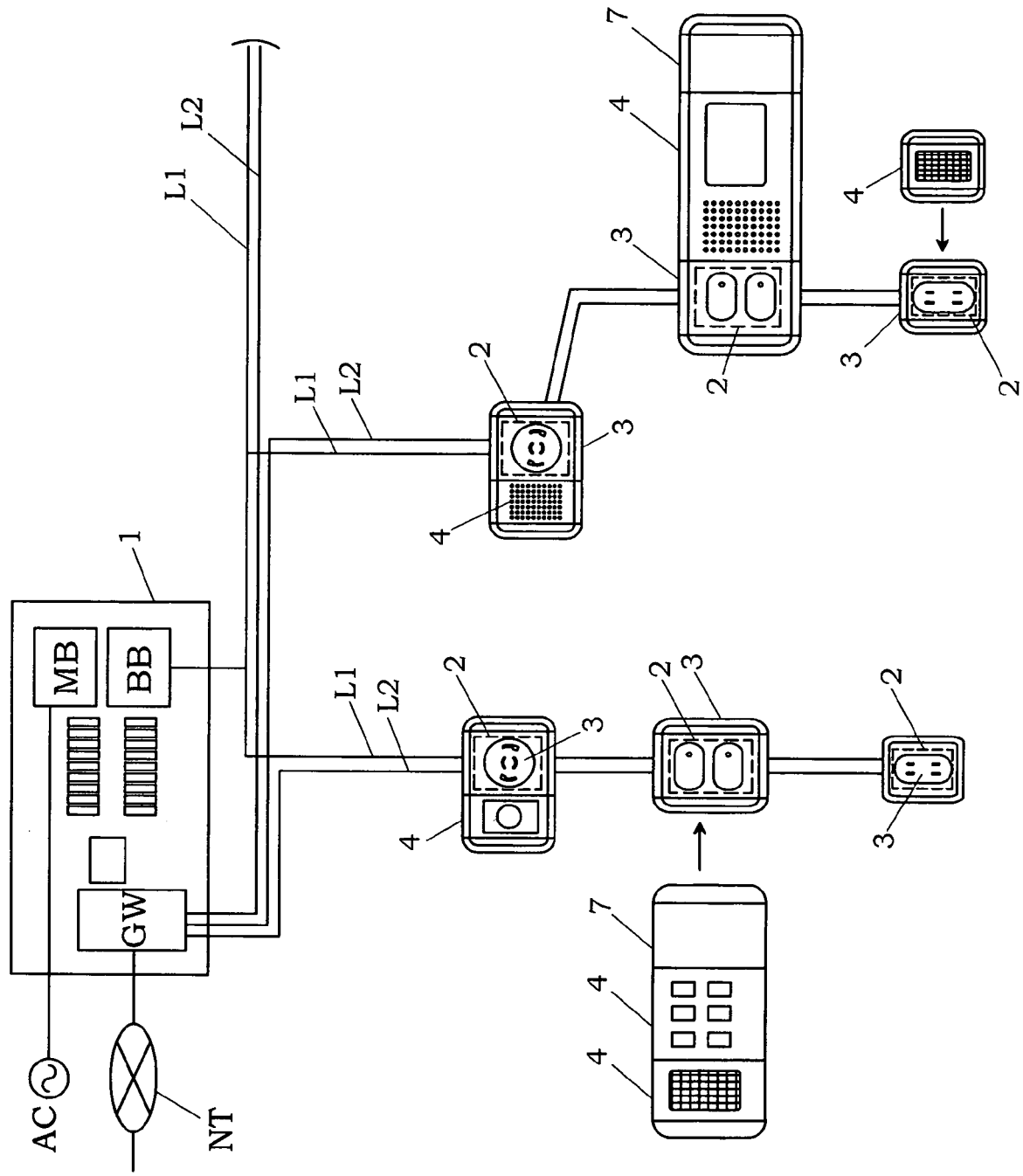
FIG. 1 is a schematic diagram of a dual wiring system according to a preferred embodiment.

As shown in FIG. 1, the dual wiring system of this embodiment has a power supply line L1 and an information line L2 installed in a building structure, which are connected to commercial power source AC and the internet network NT through a distribution board 1, a plurality of switch boxes 2 embedded in wall surfaces at plural positions in the building structure, a plurality of base units 3 mounted in the switch boxes and connected to the power supply line L1 and the information line L2, a plurality of function units 4 each having the capability of providing at least one of functions of supplying electric power from the power supply line L1, outputting information from the information line L2 and inputting information into the information line L2 when connected to the power supply line L1 and the information line L2 through one of the base units 3, and a control unit 7 detachably connected to the base unit 3 or the function unit 4. In the present specification, the wall is not limited to a sidewall formed between adjacent rooms. That is, the wall includes exterior and interior walls of the building structure, and the interior wall includes the sidewall, ceiling and floor. In FIG. 1, "MB" designates a main breaker, "BB" designates a branched breaker, and "GW" designates a gateway (e.g., router or built-in hub).

Figure 2:
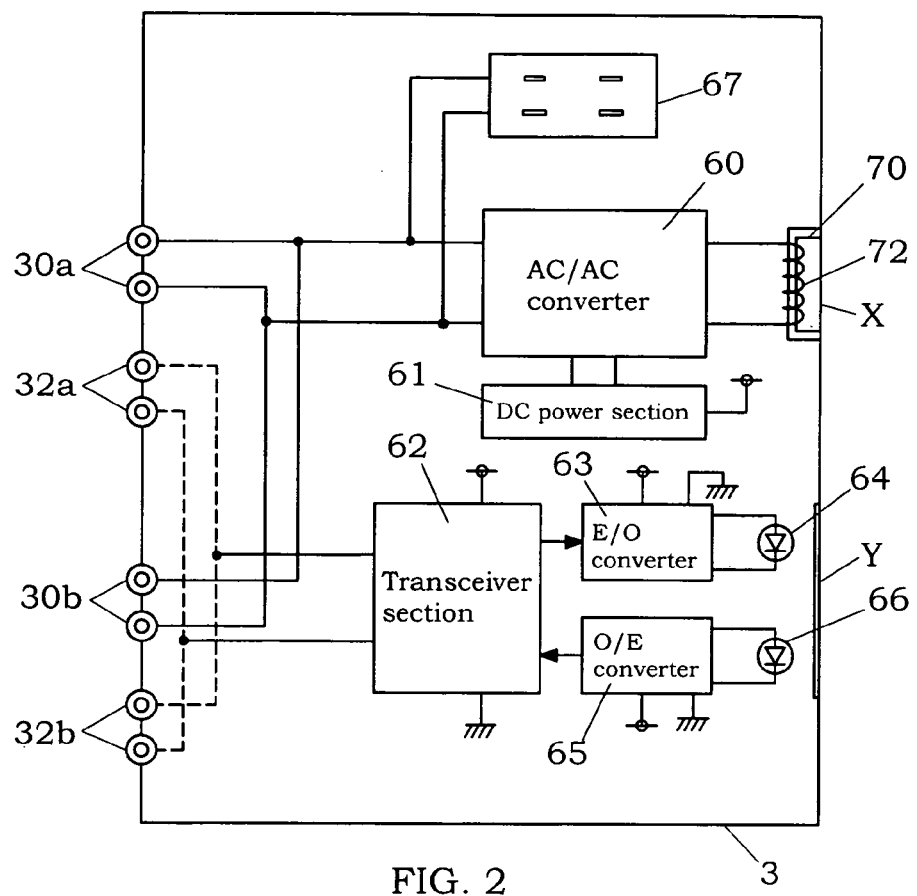
FIG. 2 is a schematic circuit diagram of a base unit of the dual wiring system.
Figure 3:
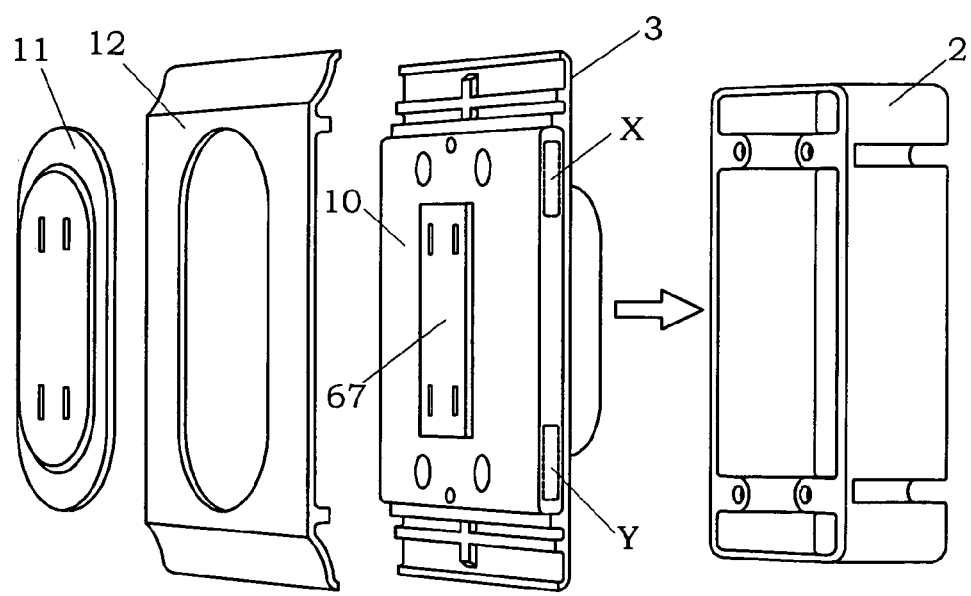
FIG. 3 is an exploded perspective view of the base unit.

As shown in FIG. 2, each of the base units 3 has terminals (30a, 32a) connected to the power supply line L1 and the information line L2, and bus-wiring terminals (30b, 32b) at its rear surface. As shown in FIG. 3, the base unit 3 is fixed to the switch box 2 by use of a fastening member such as screws. In FIG. 3, the numeral 12 designates a cosmetic cover detachably attached to a front surface of the base unit 3, and the numeral 11 designates a receptacle cover separately formed from the cosmetic cover 12. A circuit configuration provided in the base unit 3 is designed in consideration of an electric power transmission and an information signal transmission to the function unit 4 or the control unit 7. For example, the base unit 3 of FIG. 2 has an AC/AC converter 60, DC power section 61, transceiver section 62, E/O converter 63, O/E converter 65, and a function section 67.

The AC/AC converter 60 converts commercial AC power into a low AC voltage having an increased frequency, and applies the low AC voltage to a coil 72 wound around a core 70. The DC power section 61 generates an operating voltage of the internal circuit components from a stable DC voltage obtained by rectifying and smoothing the low AC voltage. The transceiver section 62 transmits and receives the information signal for enabling the interactive communication through the information line L2. The E/O converter 63 converts the information signal received from the information line L2 into an optical signal, and outputs the optical signal though a light emitting device (LED) 64. On the other hand, the O/E converter 65 receives the optical signal provided from the outside, e.g., the control unit 7 or the function unit 4 by a light receiving device (PD) 66, converts the received optical signal into the information signal, and transmits the information signal to the transceiver section 62. In FIG. 2, the numeral 67 designates a power receptacle as an example of the function section. If not needed, the function section 67 may be omitted.

In addition, another base unit 3 shown in FIG. 4 may be used. This base unit 3 is formed with a gate housing 31 made of a synthetic resin and having terminals (30a, 32a, 30b, 32b) connected to the power supply line L1 and the information line L2, and a main housing 33 made of the synthetic resin and detachably connected to the function unit 4. The gate housing 31 and the main housing 33 have a pair of a module port 34 and a module connector 42, which are detachably connected to each other to simultaneously establish both of the supply of electric power from the gate housing to the main housing, and the signal transmission between the gate housing and the main housing. In place of the main housing 33, the function unit 4 having the module connector 42 may be detachably connected to the module port 34 of the gate housing 31. In this case, the gate housing 31 having the module port 34 can be regarded as the base unit.

As shown in FIG. 5B, the module port 34 formed at the front surface of the gate housing 31 is provided with an electric power port 34a for supplying the electric power and an information signal port 34b for accessing the information line L2. In the dual wiring system, the module port 34 is standardized (normalized) with respect to arrangement and shapes of the electric power port 34a and the information signal port 34b. For example, as shown in FIG. 5B, each of the electric power port 34a and the information signal port 34b is configured in a substantially rectangular shape such that they are arranged in parallel to each other.

On the other hand, as shown in FIGS. 4 and 5A, the module connector 42 formed at the rear surface of the main housing 33 is provided with an electric power connector 42a and an information signal connector 42b. In the dual wiring system, the module connector 42 is standardized (normalized) with respect to arrangement and shapes of the electric power connector 42a and the information signal connector 42b. For example, as shown in FIG. 5A, each of the electric power connector 42a and the information signal connector 42b is configured in a substantially rectangular shape such that they are arranged in parallel to each other.

In this embodiment, the module port 34 has a guide portion 35 such as a ring-like wall or a ring-like groove extending around the electric power port 34a and the information signal port 34b. This guide portion 35 is formed to be engageable to an engaging portion 45 such as a ring-like wall of the module connector 42, which is formed on the rear surface of the main housing 33. Since the electric power connector 42a and the information signal connector 42b are simultaneously connected to the electric power port 34a and the information signal port 34b by simply engaging the engaging portion 45 to the guide portion, it is possible to improve easy exchangeability of the main housing 33. The module port 34 and the module connector 42 may be formed by female and male connectors.

In addition, the base unit 3 of FIG. 4 is designed to have a sensor function or a controller function as the function section 67. In addition, a processing section 68 such as CPU and an I/O interface 69 are formed between the transceiver section 62 and the function section 67. The processing section 68 has functions of performing signal processing of the information signal received by the transceiver section 62 to transmit the processed signal to the function section 67 through the I/O interface 69, and receiving the data signal provided from the function section 67 to output it as the information signal. Electric power needed to energize the transceiver section 62, the processing section 68 and the function section 67 is supplied from the DC power section 61. When an AC/DC converter for converting the commercial AC voltage into a required DC voltage is used in place of the AC/AC converter 60, the DC power section 61 can be omitted. Other circuit configurations of FIG. 4 are substantially the same as them of FIG. 2, and therefore duplicate explanations are omitted.

The function unit 4 is designed to provide a desired function by use of the electric power supplied through the base unit 3 and the interactive communication of the information signal with the information line L2 through the base unit 3. For example, when the function unit 4 is connected to the base unit 3 mounted in the wall surface at a high position near the ceiling, it preferably has a receptacle function of receiving a plug with hook of a lighting apparatus, a security function such as a temperature sensor, motion sensor or a monitoring camera, or an audio function such as a speaker. In addition, when the function unit 4 is connected to the base unit 3 mounted in the wall surface at a middle height, at which the function unit 4 can be easily operated by the user, it preferably has a switch function of turning on/off the lighting apparatus, a controller function for an electric appliance such as air-conditioning equipment, or a display function such as a liquid crystal display. In addition, when the function unit 4 is connected to the base unit 3 mounted in the wall surface at a low position near the floor, it preferably has a receptacle function for receiving a plug of an electric appliance such as an electric vacuum cleaner, an audio function such as a speaker, or a footlight function.

Specifically, as shown in FIG. 6, when a function section 81 of the function unit 4 is formed by the switch, operation data obtained by operating the switch is transmitted to a processing section 88 through an I/O interface 89. Then, the processed data is sent to, for example, an infrared remote controller (not shown) through a transceiver section 87, so that an electric appliance to be controlled is turned on/off by receiving a remote control signal emitted from the infrared remote controller. Alternatively, when the function section 81 is formed by the sensor, data detected by the sensor is transmitted as the information signal to the information line L2, and then informed to the user by a required communicator. In addition, when the function section 81 is formed by the speaker, sound data provided as the information signal through the information line L2 is output from the speaker. When the function section 81 is formed by the monitoring camera, compression encoding of image data taken by the monitoring camera is performed, and then output as the information signal. Furthermore, when the function section 81 is formed by a monitor device, image data provided through the information line L2 is decoded, and then displayed on the monitor device. When the function section 81 is simply formed by the power receptacle, the processing section 88 and the I/O interface 89 can be omitted. Thus, since the function units 4 having various kinds of the function sections 81 can be detachably used in the dual wiring system, the degree of freedom of layout of the function units 4 can be remarkably improved.

The coil 72 wound around the core 70 in the base unit 3 is used as power supply means for supplying electric power from the base unit 3 to the function unit 4 in a non-contact manner. That is, the coil 72 wound around the core 70 of the base unit provides an electromagnetic coupling portion that works as a first side of a transformer. On the other hand, as shown in FIG. 6, the function unit 4 has an electromagnetic coupling portion comprised of a coil 82 wound around a core 80, which works as a second side of the transformer. Therefore, by making electromagnetic coupling between the base unit 3 and the function unit 4, a low AC voltage is induced in the coil 82 of the function unit 4 to achieve the supply of electric power from the base unit 3 to the function unit 4. In this embodiment, since the low AC voltage having the higher frequency than the commercial AC voltage is obtained by the AC/AC converter 60, the electromagnetic coupling portion used as the transformer can be downsized.

In addition, the light emitting device (LED) 64 of the E/O converter 63 of the base unit 3 is used to transmit the optical signal as the information signal to the function unit 4 in a non-contact manner. In this case, a light receiving device (PD) 86 is disposed in the function unit 4 such that the light emitting device 64 of the base unit 3 is in a face-to-face relation with the light receiving device 86 of the function unit 4 when the function unit 4 is connected to the base unit 3. Similarly, to transmit the optical signal as the information signal from the function unit 4 to the base unit 3, the function unit 4 has a light emitting device (LED) 84, which is disposed in the face-to-face relation with the light receiving element (PD) 66 of the base unit 3 when the function unit 4 is connected to the base unit 3. Thus, each of the base unit 3 and the function unit 4 has the pair of the E/O converter (63, 83) and the O/E converter (65, 85) as an optical coupling portion to enable the interactive communication of the information signal therebetween.

As shown in FIGS. 2 and 3, the electromagnetic coupling portion X used for the supply of electric power and the optical coupling portion Y used for the interactive communication of the information signal are disposed at a side surface of the base unit 3 so as to be spaced from each other by a required distance. The shapes of the electromagnetic coupling portion X and the optical coupling portion Y are stylized (normalized) such that each of the base units 3 is shared by the plural function units 4. In addition, it is preferred that the pair of the electromagnetic coupling portion X and the optical coupling portion Y are provided at both sides of the function unit 4, as shown in FIG. 6. That is, the optical coupling portion Y formed at one side (e.g., left side) of the function unit 4 is composed of the light receiving device 86 located at the upper side and the light emitting device 84 located at the lower side, and the optical coupling portion Y formed at the opposite side (e.g., right side) of the function unit 4 is composed of a light emitting device 94 located at the upper side and a light receiving device 96 located at the lower side.

In this case, even when plural function units 4 are connected in series to the base unit 3, it is possible to ensure the interactive communication of the information signal between the function units 4 as well as between the base unit 3 and function unit 4. It is also preferred that a light transparent cover is attached to the respective optical coupling portion Y to protect the optical devices. As shown in FIG. 6, the function units 4 have circuit components for achieving the supply of electric power and the interactive communication of the information signal between adjacent function units 4. These circuit components are substantially the same as them used in the base unit 3, and therefore duplicate explanations concerning the same circuit components are omitted.

As shown in FIG. 3, when the function section 67 (e.g., power receptacle) is formed at the front surface of the base unit 3, and the pair of the electromagnetic coupling portion X and the optical coupling portion Y are provided at the side surface of the base unit 3, the function unit 4 can be connected to the base unit 3 along the wall surface (i.e., in substantially parallel with the wall surface). Therefore, it is possible to improve function expandability in the dual wiring system without spoiling the beauty in the indoor space.

Examples of the function units 4 connected to the base unit 3 are introduced below. In FIGS. 7A and 7B, the base unit 3 has a receptacle for a plug with hook of a lighting apparatus as the function section 67. The function unit 4 connected to the base unit 3 has a function of emitting an infrared remote-control signal. In this case, operation data obtained when another function unit having a controller function as the function section 81 is operated by a user is transmitted to the function unit 4 of FIG. 7A through the information line L2, so that the infrared remote-control signal is emitted toward an infrared signal receiving portion of an electric appliance such as air-conditioning equipment. In FIG. 7A, the numeral 58 designates a protection cover detachably attached to the side of the function unit 4 to protect the electromagnetic coupling portion X and the optical coupling portion Y when not used. In addition, when the base unit 3 has the power receptacle, a relay or a semiconductor switch may be connected to a circuit of the power receptacle such that the function of the power receptacle can be cancelled when the relay or the semiconductor switch is operated according to a control signal transmitted from another function unit.

Figure 8:
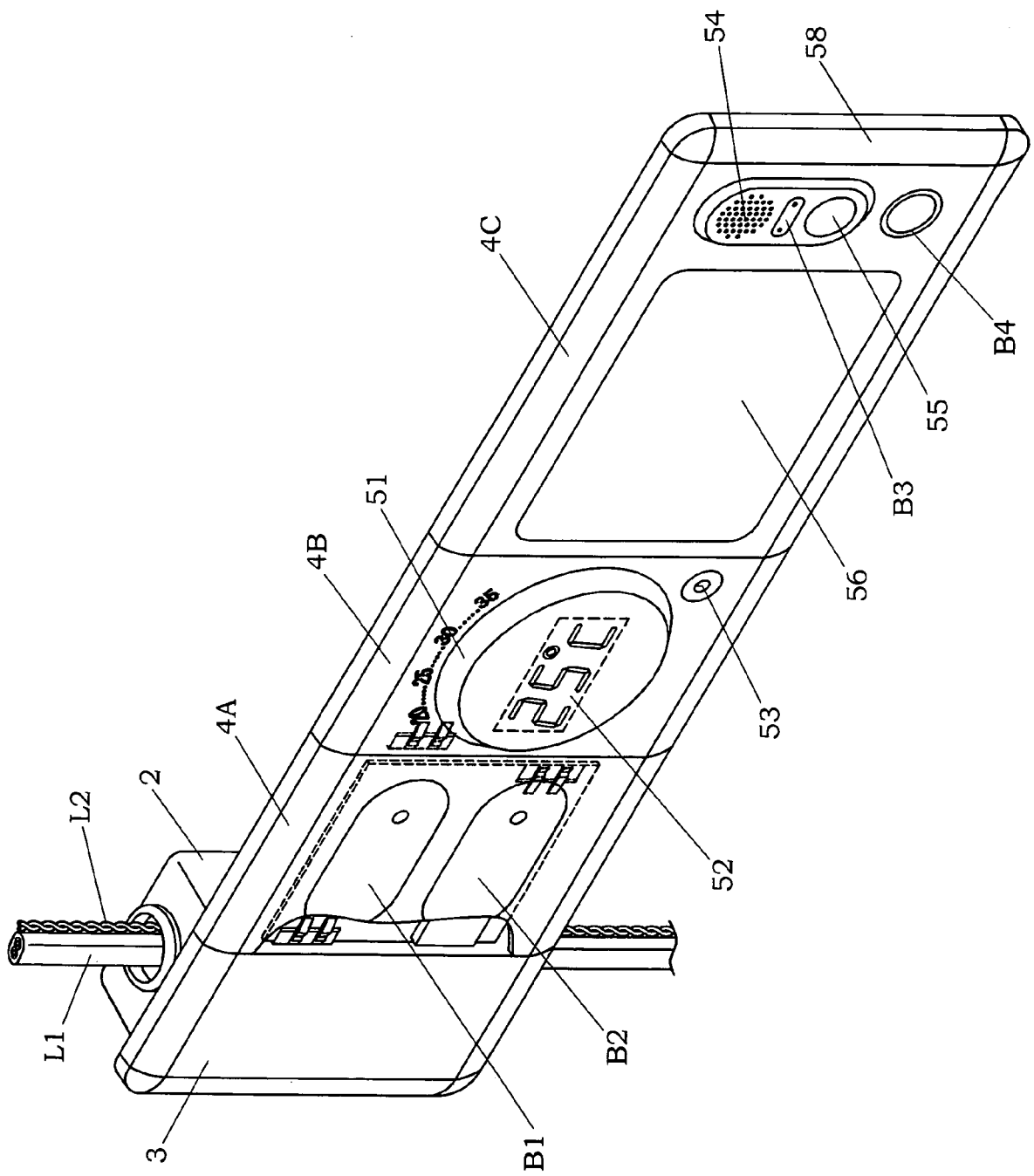
FIG. 8 is a perspective view of plural function units connected to the base unit.

In FIG. 8, first to third function units (4A, 4B, 4C) are connected to the base unit 3. In this case, the base unit 3 does not have the function section 67. The first function unit 4A detachably connected to the base unit 3 has switches for turning on/off the air-conditioning equipment as the function section 81. The second function unit 4B detachably connected to the first function unit 4A has a controller of the air-conditioning equipment as the function section 81. In addition, the third function unit 4C detachably connected to the second function unit 4B has a main unit of an intercom system as the function section 81.

The first function unit 4A is provided with an operation button B1, a stop button B2, and a CPU section for generating operation information of these buttons, and sending the operation information to the control unit 7 described later. This function unit is also preferable to operate a lighting apparatus. The second function unit 4B is provided with a temperature setting dial 51 for the air-conditioning equipment, an LCD (liquid crystal display) monitor 52 for displaying the setting temperature, a timer switch 53 for operating the air-conditioning equipment for a desired time period, and a CPU section for generating operation information of the temperature setting dial 51 and the timer switch 53, and sending the operation information to the control unit 7. The third function unit 4C is provided with a volume control button B3, a speaker 54, a mode switch 55 for switching between transmitter and receiver functions, an LCD monitor 56 for displaying the image taken by a TV camera located at a house entrance, an unlock button B4 for unlocking the door lock, and a CPU section having a sound processing function for the speaker, image processing function for the LCD monitor, and a function of generating operation information of the unlock button and the mode switch, and sending the operation information to the control unit 7.

The function section 81 of the function units 4 is not limited to the above examples. For example, a battery charger for electric shaver, electric toothbrush, mobile phone or portable audio player may be formed as the function section. In addition, the function unit 4 having a handset function of the intercom system may be connected to the base unit 3 mounted in an exterior wall surface at the house entrance.

Figure 9:
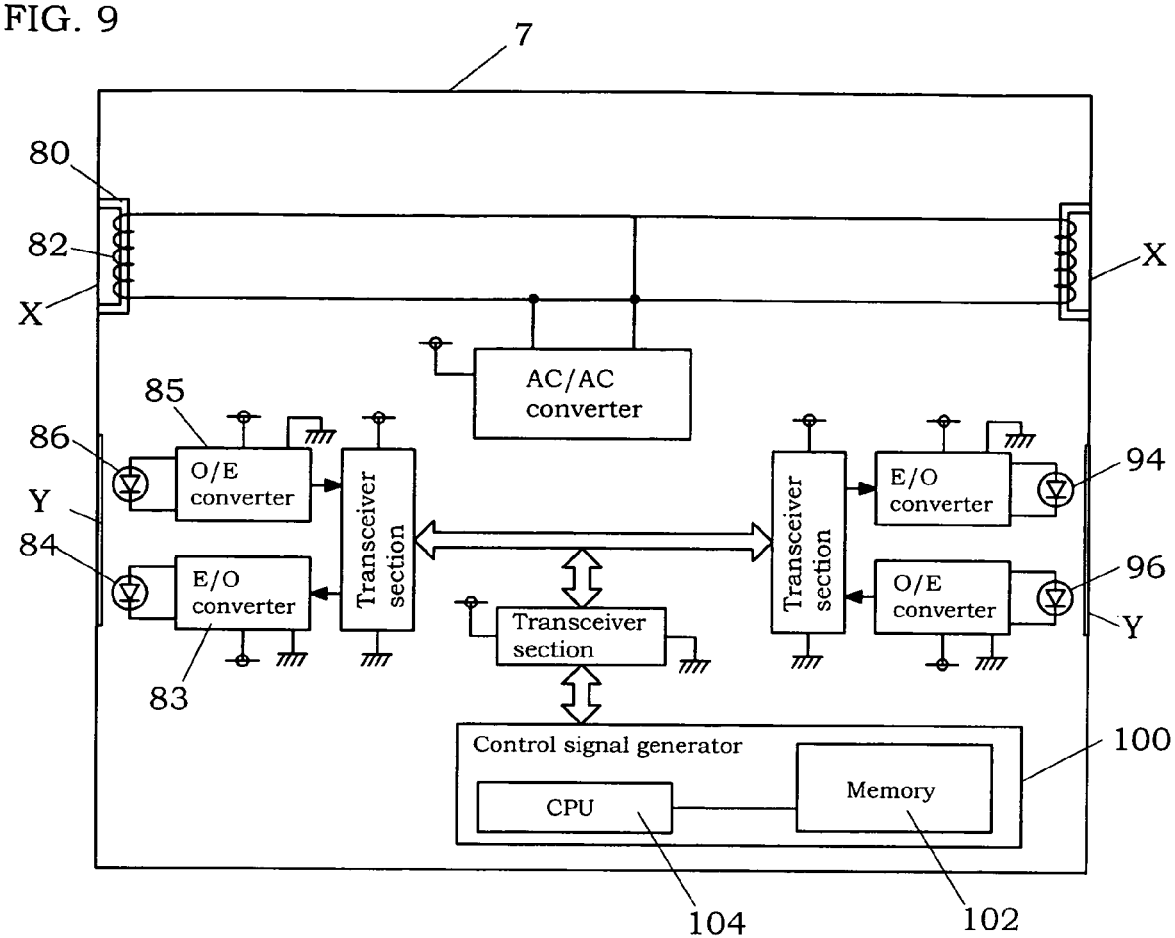
FIG. 9 is a schematic circuit diagram of a control unit.

As shown in FIG. 9, the control unit 7 has a control signal generator 100 mainly composed of a rewritable memory 102, in which a control program is stored, and the program update is available, and a CPU 104 for generating a control signal according to the control program. The basic concept of the control unit 7 of the present invention is to control, in a coordinated fashion, two or more of the function units 4 incorporated in the dual wiring system, which have been previously associated with each other by the control program, thereby achieving a higher-order function such as an interphone system, a crime-prevention system and a disaster-prevention system. For example, when the control unit 7 controls the function unit having an image display function, the function having an audio output function and the function unit having a sensor function in a coordinated fashion according to the control program for disaster prevention, a disaster-prevention function can be provided as a new higher-order function.

Therefore, in the present invention, the function unit 4 to be controlled by the control unit 7 is not limited to the function unit directly connected to the control unit 7. The function unit to be controlled is essential to have the capability of providing a function requested by the control program. Therefore, the function unit to be controlled may be connected to the base unit at a location distant from the control unit through power supply line and the information line. For example, according to the present invention, the control unit directly connected to one of the base units can control the function unit connected to another one of the base units through the power supply line and the information line.

In addition, as in the case of the function unit shown in FIG. 6, the control unit 7 has the electromagnetic coupling portion X and the optical coupling portion Y. That is, the control unit 7 is formed at both sides with the electromagnetic coupling portion X configured to transmit the electric power to an adjacent unit in a non-contact manner, and the optical coupling portion Y configured to establish the interactive communication of the information signal with the adjacent unit in a non-contact manner. For example, the control unit 7 can be detachably connected to the function unit 4 connected to the base unit 3. Alternatively, the control unit may be detachably connected to an end one of a plurality of the function units connected to the base unit 3 in series. Furthermore, the control unit 7 can be detachably connected between the function units 4 or between the base unit 3 and the function unit 4.

Figure 10:
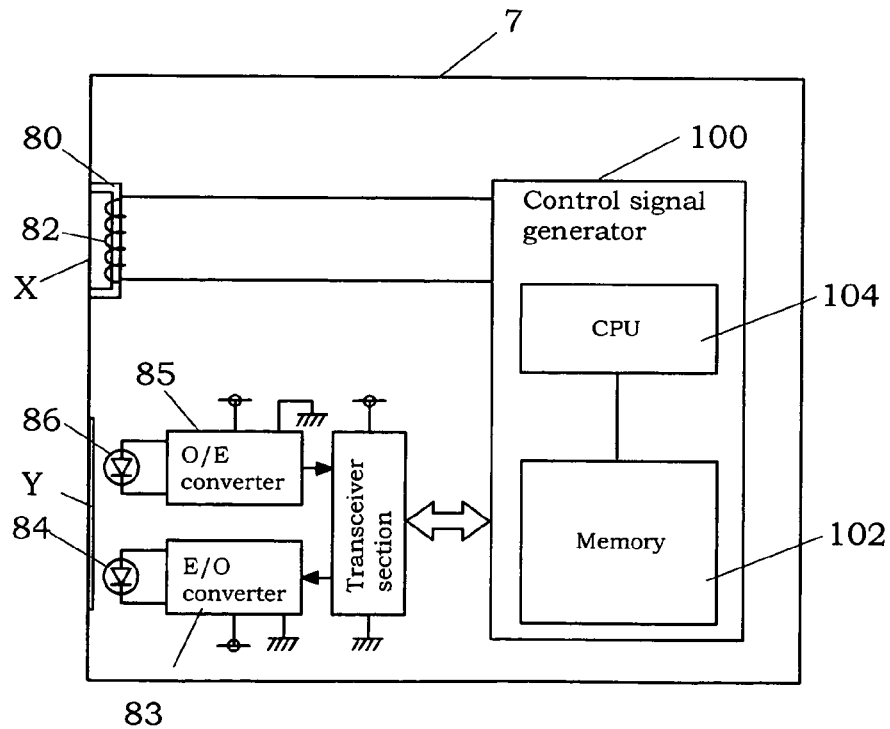
FIG. 10 is a schematic circuit diagram of another control unit.
Figure 11:
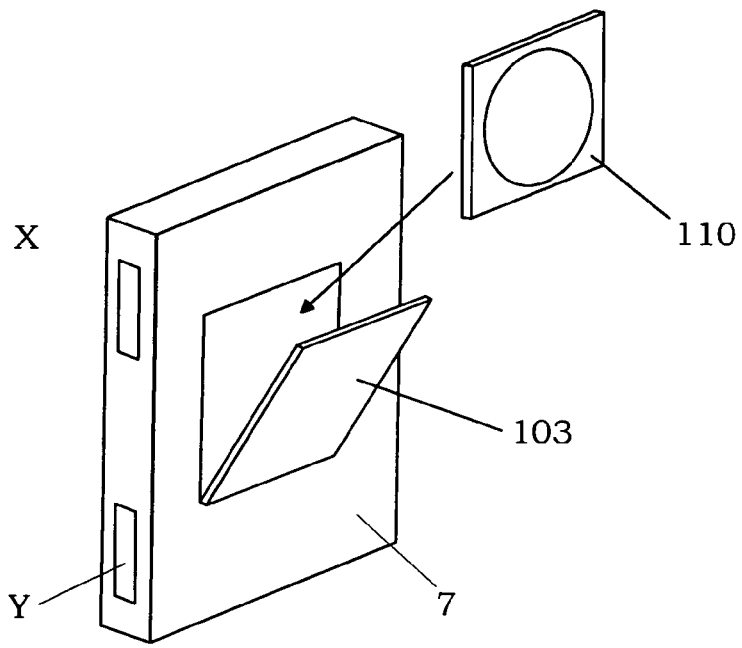
FIG. 11 is a schematic circuit diagram of a control unit with a drive device.
Figure 12:
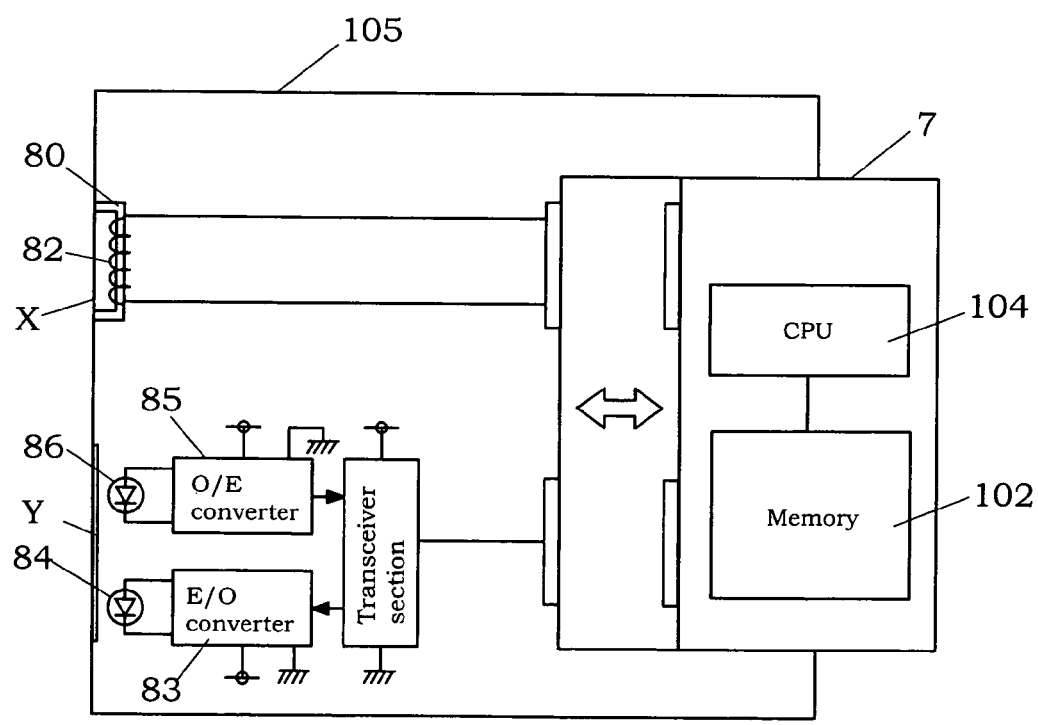
FIG. 12 is a schematic circuit diagram of still another control unit.

From the viewpoint of achieving a cost reduction of the control unit 7, as shown in FIG. 10, the electromagnetic coupling portion X and the optical coupling portion Y may be provided at only one side of the control unit 7. The operation of rewriting or updating the control program may be performed by use of a personal computer through the information line L2. In addition, as shown in FIG. 11, the control unit 7 may have a drive device 103, in which a storage medium 110 such as CD, DVD disc or a SD memory having the control program for function units is detachably inserted. Moreover, as shown in FIG. 12, the control unit 7 may be simply formed with the CPU 104 and the memory 102. In this case, the control unit 7 can be detachably connected to an adapter 105 having the electromagnetic coupling portion X and the optical coupling portion Y, which is used to make a connection between the control unit 7 and the base unit 3 or the function unit 4.

Figure 13:
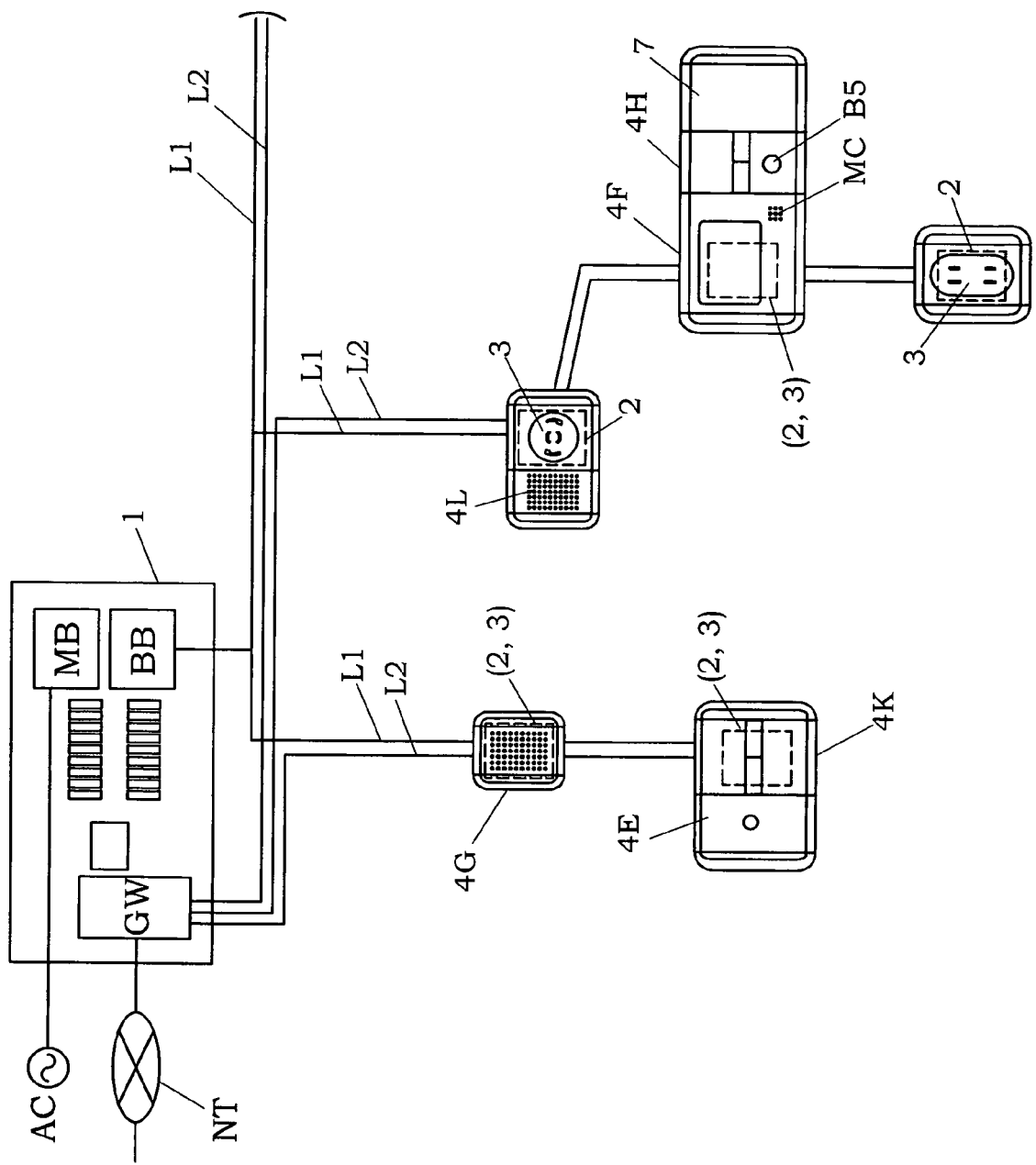
FIG. 13 is a schematic diagram of an interphone system constructed by use of the control unit and plural function units in the dual wiring system.

Next, operations of the control unit 7 are explained in detail according to some examples. First, the following is an explanation about a case where the control program of the control unit 7 is an interphone communication program. In this case, as shown in FIG. 13, the function unit 4E for taking an image of a visitor, the function unit 4F having an image display function, the function units (4G, 4L) having an audio output function, and the function units (4K, 4H) for operating the interphones are controlled in a coordinate fashion by the control unit 7.

When a visitor pushes a call button of the function unit 4K, image data taken by a camera of the function unit 4E and a call signal are received by a transceiver section of the control unit 7 through the information line L2, and then sent to the control signal generator 100. In the control signal generator 100, the CPU 104 generates a control signal for producing a ringing sound, and sends the control signal to the function unit 4L having the audio output function, which has been previously associated with the function unit 4K operated by the visitor. In addition, the control unit 7 sends the image data taken by the function unit 4E to the function unit 4F having the image display function. According to the control signal, the function unit 4L outputs the ringing sound from a speaker, and the function unit 4F displays the image of the visitor on the liquid crystal display.

Next, when the dweller pushes a conversation button of the function unit 4H to make a conversation with the visitor, an information signal indicating that the conversation button has been pushed is sent from this function unit to the control unit 7. When this information signal is received by the control unit 7, the control signal generator 100 generates a control signal for making a communication line with the visitor, and sends the control signal to the function unit 4G having the audio output function. The voice information of the dweller is received and converted into an electric signal by a microphone MC of the function unit 4F, and then the electric signal is sent to the function unit 4G. In the function unit 4G, the voice information is output from the speaker according to the electric signal. Thus, the conversation between the visitor and the dweller can be achieved by this interphone system. The function unit 4L having the audio output function may be disposed between the function units (4F, 4H).

On the other hand, when a volume control button B5 for adjusting the ringing sound of the function unit 4H is operated, an information signal indicating that the volume control button has been operated and an information signal concerning the adjustment amount of the ringing sound are generated in the function unit 4H, and then sent to the control unit 7. In the control unit 7, according to the information signals, the control signal generator 100 generates a control signal for adjusting the volume of the ringing sound, and sends the control signal to the function unit 4G having the audio output function. In the function unit 4G, according to this control signal, the volume of the ringing sound output from the speaker is adjusted.

Figure 14:
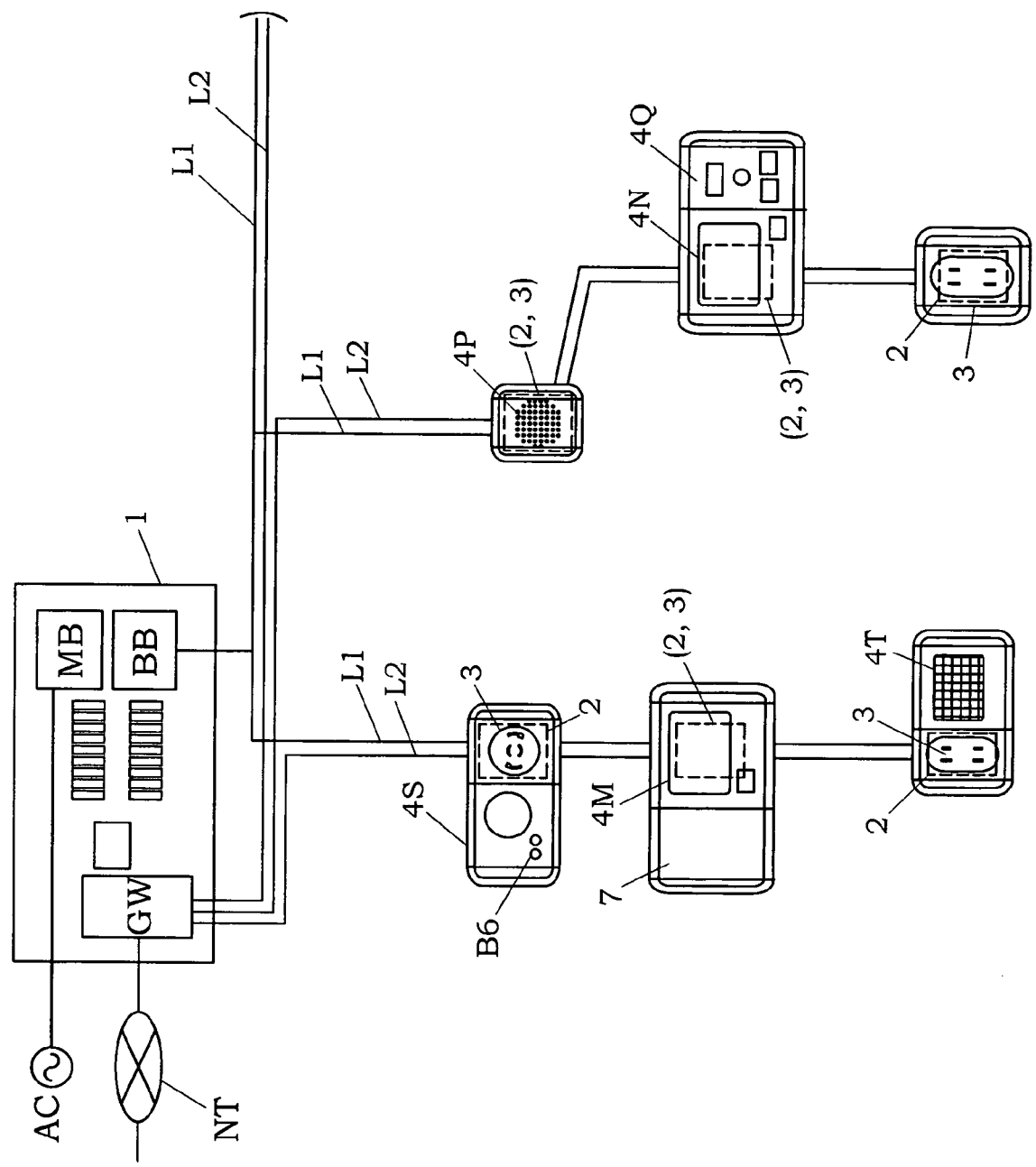
FIG. 14 is a schematic diagram of a disaster prevention system constructed by use of the control unit and plural function units in the dual wiring system.

In addition, the following is an explanation about a case where the control program of the control unit 7 is a disaster-prevention program. In this case, as shown in FIG. 14, the function units (4M, 4N) having an image display function such as a liquid crystal display, the function units (4P, 4T) having an audio output function, the function unit 4S having a sensor function, and the function unit 4Q for setting parameters of the crime-prevention system and switching the image displayed on the liquid crystal display are controlled in a coordinate fashion by the control unit 7.

When a smoke detector or a temperature sensor formed in the function unit 4S detects the occurrence of a fire, the detection signal is sent to the control unit 7. In the control unit 7, according to the detection signal, the control signal generator 100 generates a control signal for producing an alarm sound, and a control signal for displaying a fire alarm on the liquid crystal display. These control signals are respectively sent to the function units (4P, 4T) having the audio output function and the function units (4M, 4N) having the image display function. Thereby, the function units (4P, 4T) give the alarm sound informing the occurrence of the fire to the dweller. In addition, the function units (4M, 4N) visually inform the occurrence of the fire to the dweller by displaying a message of the fire alarm on the liquid crystal display in a blinking manner. Alternatively, the control signal may be generated to automatically inform the occurrence of the fire to the dweller by telephone. In this case, according to the receipt of the control signal, a corresponding function unit automatically makes a telephone call to a previously registered telephone number of the dweller.

On the other hand, when an alarm stop button B6 formed in the function unit 4S is operated, an information signal indicating that the alarm stop button has been operated is sent to the control unit 7. According to this information signal, the control unit 7 generates and outputs control signals for stopping the alarm sound and the message of the fire alarm. According to the receipt of the control signals, the corresponding function units stop the output of the alarm sound and the message of the fire alarm. The alarm stop button B6 may be formed in the function unit 4Q.

Figure 15:
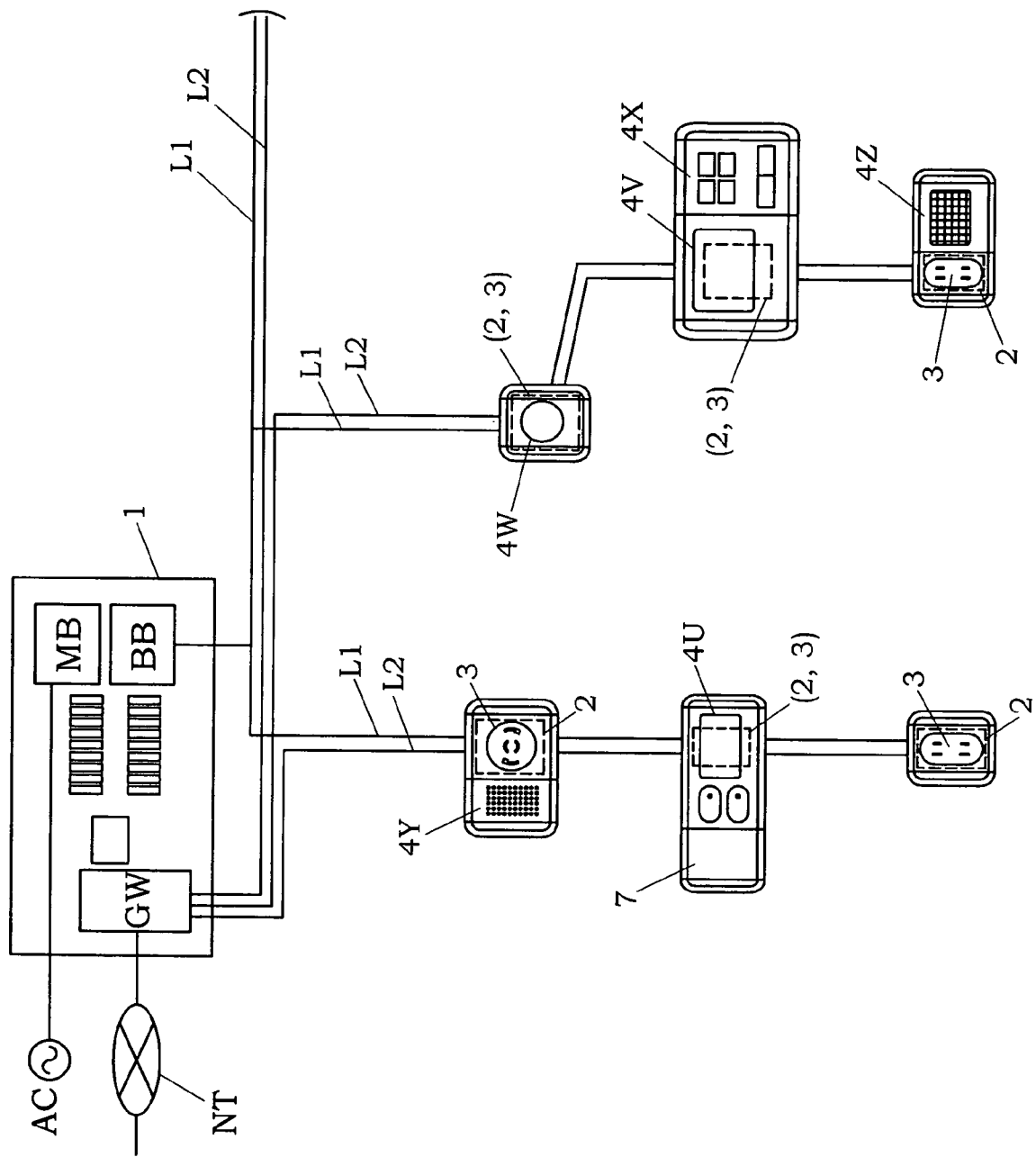
FIG. 15 is a schematic diagram of a crime prevention system constructed by use of the control unit and plural function units in the dual wiring system.

The following is an explanation about a case where the control program of the control unit 7 is a crime-prevention program. In this case, as shown in FIG. 15, the function units (4U, 4V) having an image display function such as a liquid crystal display, the function units (4Y, 4Z) having an audio output function, the function unit 4W having a sensor function, and the function unit 4X for setting parameters of the crime-prevention system and unlocking the system are controlled in a coordinate fashion by the control unit 7.

When an intrusion of a moving object (intruder) into a room is detected by a motion sensor or an infrared sensor formed in the function unit 4W, a detection signal is sent to the control unit 7. Alternatively, another function unit having a sensor for detecting that a door or a window has been opened may be used to send the detection signal to the control unit 7. Furthermore, when the function unit 4X is operated to unlock the crime-prevention system not through predetermined procedures, a detection signal indicating the occurrence of unusual may be sent to the control unit 7.

In the control unit 7, the control signal generator 100 generates a control signal for producing an alarm sound against the intruder, and a control signal for displaying an intrusion alarm on the display, and then sends these control signals to the function units (4Y, 4Z) having the audio output function and the function units (4U, 4V) having the image display function, respectively. Thereby, the function units (4Y, 4Z) inform the occurrence of unusual to the dweller by outputting the alarm sound. In addition, the function units (4U, 4V) visually inform the occurrence of unusual to the dweller by displaying a message (e.g., a pictorial symbol) of the intrusion alarm. In place of displaying the alarm message on the liquid crystal display, a LED or the like may be blinked as the alarm. Alternatively, it is preferred to use a function unit having a function of automatically making a telephone call to a previously registered telephone number of a security company or a police office according to the receipt of the control signal indicating the occurrence of unusual.

Thus, according to the present invention, since the control unit 7 controls a plurality of function, units, each of which merely provides a relatively simple function by itself, in a coordinated fashion, it is possible to realize a higher-order function system such as the interphone system, the crime-prevention system and the disaster-prevention system, as described above. In addition, when using a plurality of control units having different control programs, a speaker unit or a display unit is shared by the control units to construct the respective systems. Therefore, it is not needed to purchase the speaker and the display unit for every system. As a result, there is a further advantage of achieving an improvement in cost performance of the entire system.

Next, a method of mounting the base unit to a wall surface is explained. In the present explanation, the base unit 3 is directly fixed to the switch box 2. If necessary, the base unit 3 may be fixed to the switch box 2 through an attachment plate 75, as shown in FIG. 16. In this case, after hooks formed at both sides of the attachment plate 75 are engaged to the base unit 3, the attachment plate 75 with the base unit 3 is fixed to the switch box 2 by use of mounting screws. Alternatively, the base unit 3 may be directly mounted in the wall surface by use of exclusive clamps (not shown) without using the switch box 2. After the base unit is mounted to the wall surface, the receptacle cover 11 and the cosmetic cover 12 are attached to the front surface of a housing 10 of the base unit 3.

Next, means for making a stable mechanical connection between the base unit 3 and the control unit 7 or between the function unit 4 and the control unit 7 is explained.

The control unit 7 can be attached to the base unit 3, as shown in FIG. 17A. That is, the cosmetic cover 12 is firstly removed from the base unit 3. In the present embodiment, since the receptacle cover 11 is separately formed from the cosmetic cover 12, the function section 67 such as the power receptacle can be protected from an accidental breakage by the receptacle cover 11 during the connecting and disconnecting operation of the control unit 7. After the control unit 7 is placed at one side of the function unit 4 such that the electromagnetic coupling portion X and the optical coupling portion Y of the control unit 7 are disposed in face-to-face relation with them of the base unit 3, the control unit 7 is mechanically coupled to the base unit 3 by use of a joining member 90. Each of the base unit 3 and the control unit 7 has a housing (10, 20) having horizontal guide rails (14, 24) at its upper and lower end portions. The numeral 15 designates a stopper wall formed at a substantially center position in the longitudinal direction of the guide rail 14. On the other hand, as shown in FIG. 17B, the joining member 90 has a groove 92, in which the guide rails (14, 24) can be fitted.

As shown in FIG. 17A, on the condition that the guide rail 14 is fitted in the groove 92, the joining member 90 is slid along the guide rail until contacting the stopper wall 15. As a result, the joining member 90 is engaged to the base unit 3 over about half length of the joining member. On the other hand, the joining member 90 is also engaged to the control unit 7 in a similar manner to the above over the remaining length of the joining member. Thus, after the engagements between the joining member 90 and the base unit 3 and between the joining member 90 and the control unit 7 are finished at both of the upper and lower end portions, cosmetic covers (12, 22) are attached to the front surfaces of the base unit 3 and the control unit 7. Since the joining member 90 is held between the cosmetic covers (12, 22) and the housings (10, 20) of the base unit 3 and the control unit 7, it is possible to prevent accidental falling of the joining member 90, and obtain the stable mechanical connection therebetween without spoiling the beauty thereof.

Figures 18A, 18B:
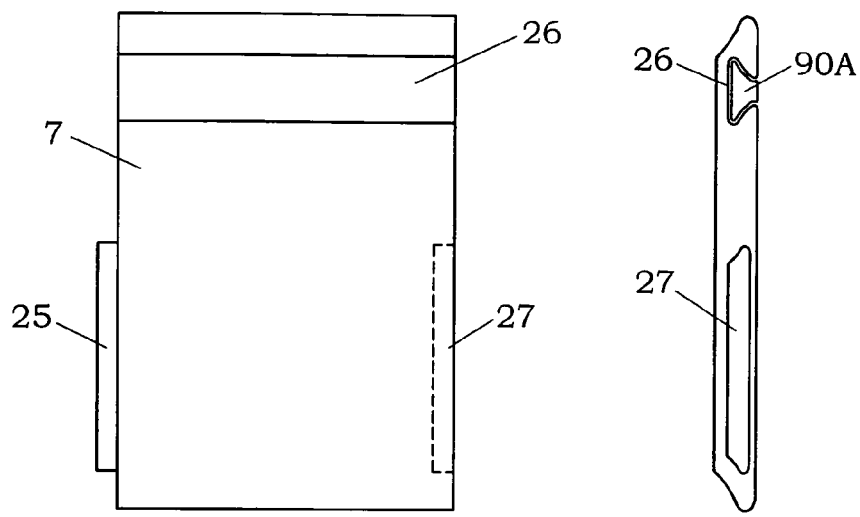
FIGS. 18A and 18B are front and side views of the control unit.
Figure 18C:
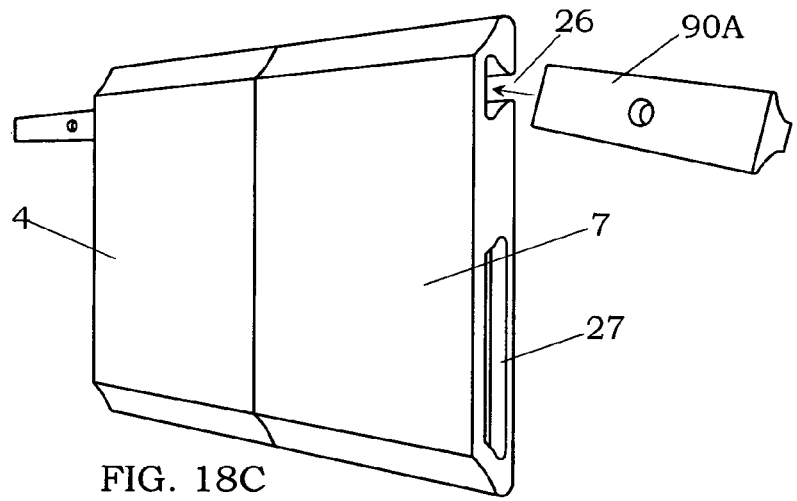
FIG. 18C is a perspective view showing how to use the joining member.

As a modification of the mechanical connection method described above, as shown in FIGS. 18A to 18C, the control unit 7 has a male connector 25 at its one side, and a female connector 27 at the other side. Each of these connectors is formed with the electromagnetic coupling portion X and the optical coupling portion Y. In this case, the male connector 25 and the female connector 27 can be regarded as the module connector and the module port, respectively. In addition, the male connector and the female connector are formed in each of the function unit 4 and the base unit 3, so that the electric power transmission and the signal transmission become available between the control unit 7 and the base unit 3 and between the control unit 7 and the function unit 4 by means of electromagnetic coupling and optical coupling. For example, the male connector 25 of the control unit 7 is detachably connected to the female connector 27 formed in the base unit 3, and the female connector 27 of the control unit 7 is detachably connected to the male connector 25 formed in the function unit 4.

In addition, this control unit 7 has a horizontal groove 26, in which a joining member 90A having a similar cross section to the groove 26 can be fitted. As in the case of the joining member 90 of FIG. 17B, one end of the joining member 90A is inserted into the groove 26 of the control unit 7 over about half length of the joining member, and also the other end of the joining member 90A is inserted into a groove formed at an adjacent base unit 3 or an adjacent function unit 4 over the remaining half length of the joining member to provide the stable mechanical connection therebetween. In this case, since the groove 26 has a substantially trapezoidal section configured such that an opening formed at the rear surface of the control unit 7 corresponds to a narrow side of the trapezoidal section, the falling of the joining member 90A from the groove 26 can be prevented without using the cosmetic cover. In addition, since the user can access the joining member 90A through the opening of the rear surface of the control unit 7, the slide movement of the joining member 90A in the groove 26 can be relatively easily performed. The shape of the groove is not limited to the trapezoidal section on the condition that the joining member 90A can not removed through the opening formed at the rear surface of the control unit 7.

Figures 19A, 19B:
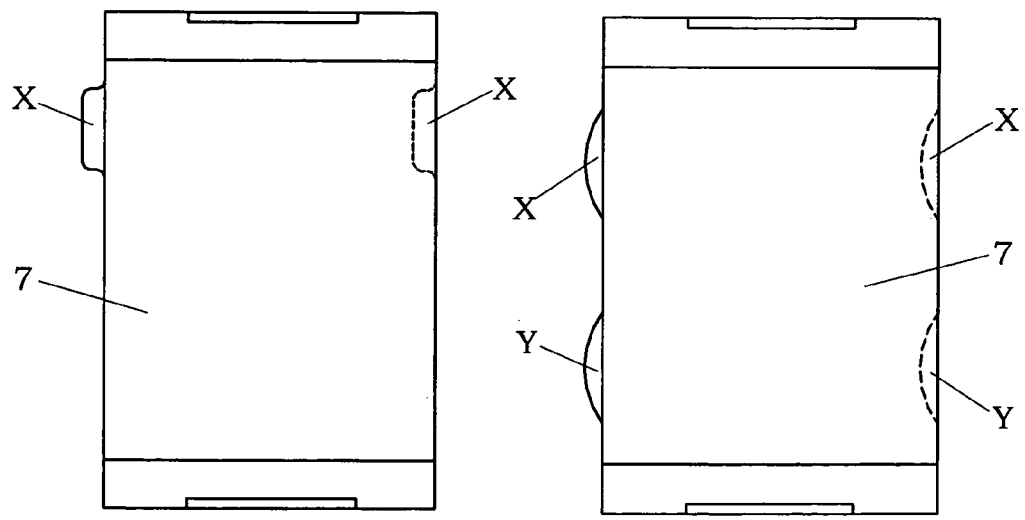
FIGS. 19A and 19B are front views showing another examples of the control unit.

As shown in FIG. 19A, only the electromagnetic coupling portion X may be formed by the female and male connectors. When the male connector is provided at one side of the control unit 7, the female connector is provided at the other side thereof. Alternatively, as shown in FIG. 19B, each of the electromagnetic coupling portion X and the optical coupling portion Y may be provided by a female connector shaped in an arcuate concave and a male connector shaped in an arcuate convex. Thus, when using the female and male connectors, it is possible to provide accurate positioning between the adjacent units, and consequently improve the reliability of the supply of electric power and the interactive communication of the information signal.

Figure 20A:
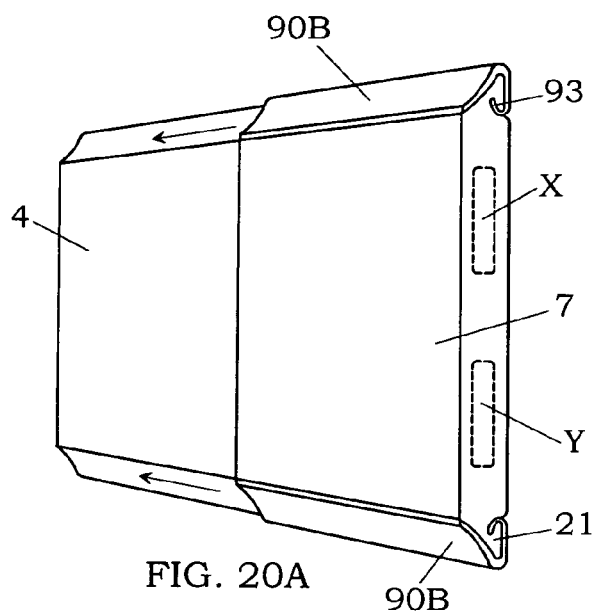
FIGS. 20A and 20B are perspective views showing a connection method between the control unit and the function unit.
Figure 20B:
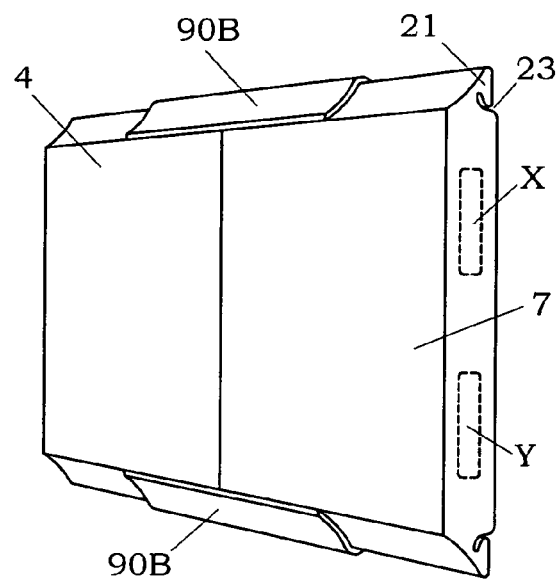

In addition, as shown in FIG. 20A, it is preferred that each of the upper and lower end portions of the control unit 7 has a tapered end 21 with an engaging groove 23, and a joining member 90B is configured to slidably contact the tapered end 21 and have a hook 93, which can be fitted in the engaging groove 23, at its one end. In this case, after the joining member 90B is fitted to the tapered end 21 at each of the upper and lower ends of the control unit 7, the joining member 90B is slid toward an adjacent function unit 4, as shown by the arrows in FIG. 20A. As a result, the stable mechanical connection between the control unit 7 and the function unit 4 can be obtained by use of the joining member 90B, as shown in FIG. 20B.

Figure 21A:
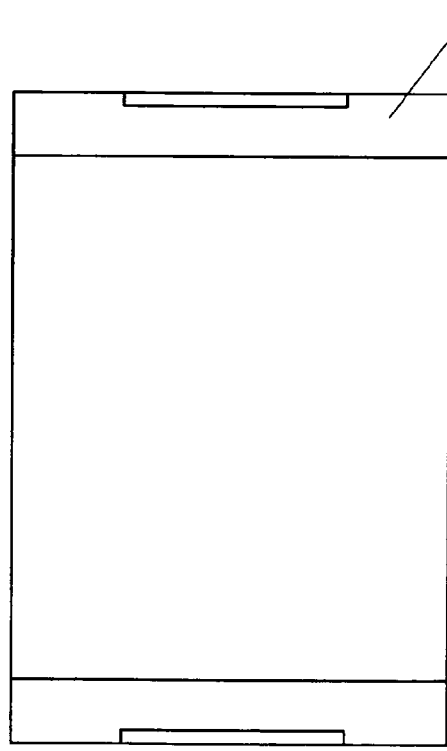
FIGS. 21A to 21C are front and side views of another example of the control unit.
Figures 21B, 21C:
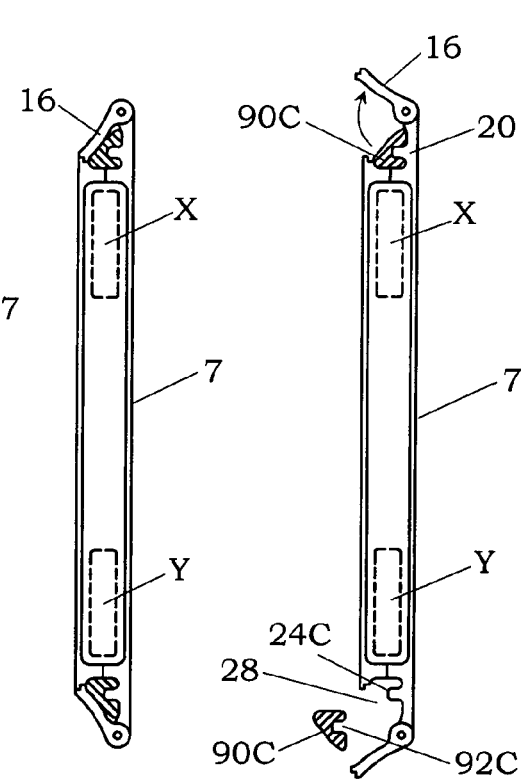

In addition, as shown in FIGS. 21A to 21C, it is preferred that each of the upper and lower end portions of the control unit 7 has a concave portion 28 for accommodating a joining member 90C, and a cover member 16 pivotally supported at its one end to the housing 20 of the control unit 7. The joining member 90C has a groove 92C, in which a guide rail 24C formed in the concave portion 28 can be sidably fitted. In this case, after the cover member 16 is opened to access the joining member 90C, the joining member is slid along the guide rail 24C, as in the case of FIG. 17A. Finally, the cover member 16 is closed to obtain the stable mechanical connection between the control unit 7 and the function unit 4. In addition, since the joining member 90C is always accommodated in the concave portion 28, there is no worry about loss of the joining member 90C.

The above-explained connection method between the control unit and the base unit or the function unit is also available as the connection method between the base unit and the function unit or between the function units, and the same advantages can be obtained thereby.

As an information-signal transmitting method available in the dual wiring system of the present invention, one of baseband transmission and broadband transmission can be used. In addition, the protocol is not limited to a specific one. For example, sound and image signals may be transmitted and received according to JT-H232 packet to obtain the interactive communication between a base device and a handset of the intercom system. In a control system, it is also preferred to use a routing control protocol for a broadcast or a unicast where controlling can be performed at a control ratio of 1:1 or 1:N according to operation data. Alternatively, when the protocol used between the base units is different from the protocol used in the function unit or the control unit connected to the base unit, it is preferred that a protocol conversion is performed at the base unit.

INDUSTRIAL APPLICABILITY

As understood from the above embodiments, according to the dual wiring system of the present invention, a higher order system such as the interphone system, the crime-prevention system and the disaster-prevention system can be constructed by controlling two or more of the function units in a coordinate fashion by the control unit. Therefore, as compared with the case of providing a relatively simple function by the individual function units, it is possible to increase function expandability. In addition, when the control unit is detachably connected to the function unit or the base unit, the function units are detachably connected to each other, and the function unit is detachably connected to the base unit, it becomes easy for the general user to change the layout of the control unit or the function unit because no complicated repair work is needed. Furthermore, when the electromagnetic coupling portion X and the optical coupling portion Y are formed in the module connector and the module port to simultaneously establish interactive communication of the information signal and the power transmission between the adjacent units, it is possible to provide a reliable wiring system with reduced transmission loss. Thus, the present invention provides the wiring system for the next generation to achieve comfortable and convenient living and working environments according to the user's needs in the information society.

The invention claimed is:

1. A dual wiring system comprising:
a plurality of base units adapted to be mounted in plural positions of
at least one wall surface of a building structure, and connected to both of an electric power line and a separate information line installed in said building structure;
a plurality of function units each configured to provide at least one of functions of supplying electric power from said electric power line, outputting information from said information line, and inputting information into said information line when connected to said electric power line and said information line through one of said base units; and
a control unit detachably connected to one of said function units or one of said base units, and configured to control at least two of said function units connected to said electric power line and said information line through said base unit(s),
wherein said control unit and one of said base units or one of said function units have a pair of a module port and a module connector, which are detachably connected to each other to simultaneously establish both of an electric power transmission therebetween and a signal transmission therebetween; and
wherein one of said module connector and said module port is formed at a side of said control unit such that said control unit is detachably connected to one of said base units or one of said function units in a direction along said wall surface.

2. The dual wiring system as set forth in claim 1, wherein said control unit has a drive device, in which a storage medium having control information for said function units is detachably inserted.

3. The dual wiring system as set forth in claim 1, wherein said control unit has a storage portion configured to rewritably store control information for said function units, and a transmission portion configured to transmit the control information provided from said storage portion to said function units.

4. The dual wiring system as set forth in claim 1, wherein said control unit at least controls three function units having an information display function, an audio output function and an operation function of an electric appliance, thereby constructing an interphone system, a crime-prevention system or a disaster-prevention system.

5. The dual wiring system as set forth in claim 1, further comprising power supply means configured to supply electric power from one of said base units or one of said function units to said control unit by means of electromagnetic coupling.

6. The dual wiring system as set forth in claim 1, further comprising a signal transmission means configured to make an information transmission between said control unit and one of said base units or one of said function units by means of optical coupling.

7. The dual wiring system as set forth in claim 1, wherein said module connector and said module port have a pair of an electric power connector and an electric power port, which are detachably connected to each other to make the electric power transmission, and a pair of a signal connector and a signal port, which are detachably connected to each other to make the signal transmission.

8. The dual wiring system as set forth in claim 7, wherein said electric power connector provides the electric power transmission by means of electromagnetic coupling when connected with said electric power port, and said signal connector provides the signal transmission by means of optical coupling when connected with said signal port.

9. The dual wiring system as set forth in claim 7, further comprising engaging means configured to provide a mechanical support between said module connector and said module port when said electric power connector and said signal connector are respectively connected to said electric power port and said signal port.

10. The dual wiring system as set forth in claim 1, further comprising joining means configured to mechanically join said control unit to one of said base units or one of said function units.

11. The dual wiring system as set forth in claim 10, wherein said joining means comprises a first engaging portion formed on one of said base units or one of said function units, a second engaging portion formed on said control unit, and a joining member configured to provide a mechanical connection between said control unit and one of said base units or one of said function units when apart of said joining member is engaged to said first engaging portion, and the remaining portion of said joining member is engaged to said second engaging portion.

12. The dual wiring system as set forth in claim 1, wherein each of said base units has one of a module port and a module connector, which is detachably connected to the other one of said module port and said module connector formed in one of said function units, thereby simultaneously establishing both of an electric power transmission between said base unit and said function unit and a signal transmission between said base unit and said function unit.

13. The dual wiring system as set forth in claim 1, wherein at least one of said function units has an electric power connector, which is detachably connected to an electric power port formed in another one of said function units to provide an electric power transmission therebetween, and a signal connector, which is detachably connected to a signal port formed in said another one of said function units to provide a signal transmission therebetween.

14. The dual wiring system as set forth in claim 1, wherein one of said function units is shared between first and second control units having different control programs, each of which is formed by said control unit.

* * * * *